(12) United States Patent
Saito et al.

(10) Patent No.: US 12,244,780 B2
(45) Date of Patent: Mar. 4, 2025

(54) PRINTING SYSTEM AND SUB PRINTER

(71) Applicant: ALPS ALPINE CO., LTD., Tokyo (JP)

(72) Inventors: Seiichiro Saito, Miyagi (JP); Naoki Saito, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/481,498

(22) Filed: Oct. 5, 2023

(65) Prior Publication Data

US 2024/0146857 A1    May 2, 2024

(30) Foreign Application Priority Data

Oct. 28, 2022 (JP) .................................. 2022-173752

(51) Int. Cl.
*H04N 1/32* (2006.01)

(52) U.S. Cl.
CPC . *H04N 1/32539* (2013.01); *H04N 2201/3219* (2013.01)

(58) Field of Classification Search
CPC ................... H04N 1/32539; H04N 2201/3219
USPC .................................................. 358/1.15, 1.9
See application file for complete search history.

(56) References Cited

U.S. PATENT DOCUMENTS

| 2004/0179230 A1 | 9/2004 | Kitada et al. |
| 2012/0069391 A1* | 3/2012 | Yonezawa ............. G06F 3/1229 358/1.15 |
| 2016/0127600 A1* | 5/2016 | Beatty ................ H04N 1/00244 358/1.15 |

FOREIGN PATENT DOCUMENTS

JP    2004-220565    8/2004

* cited by examiner

*Primary Examiner* — Quang N Vo
(74) *Attorney, Agent, or Firm* — IPUSA, PLLC

(57) ABSTRACT

A printing system includes: a main printer configured to print an image sheet by sheet; a sub printer communicably connected to the main printer and configured to print an image sheet by sheet; and a storage medium that is configured to store image data of a plurality of images and from which the main printer is able to read out the image data. In response to changing of a state of the sub printer, the sub printer notifies the main printer of a changed state. The main printer regularly checks print situations of the main printer and the sub printer. In accordance with the print situations that are regularly checked, the main printer determines which of the printers is to be used for printing of an image for each of the image data of the plurality of images.

11 Claims, 15 Drawing Sheets

FIG.5
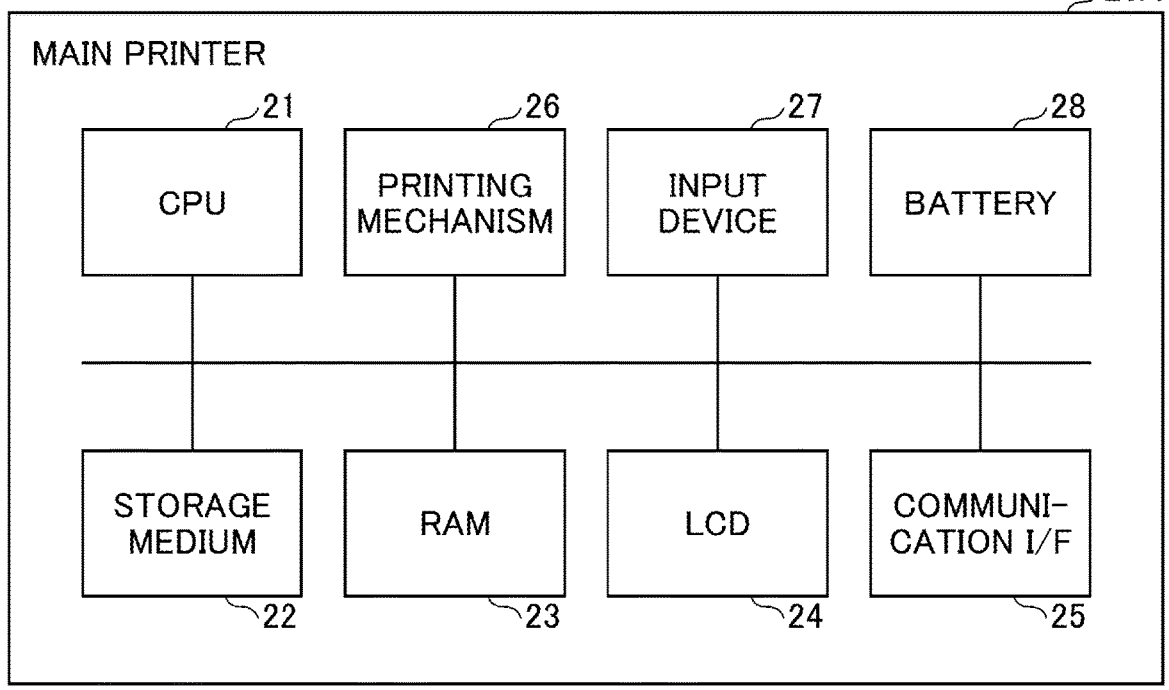
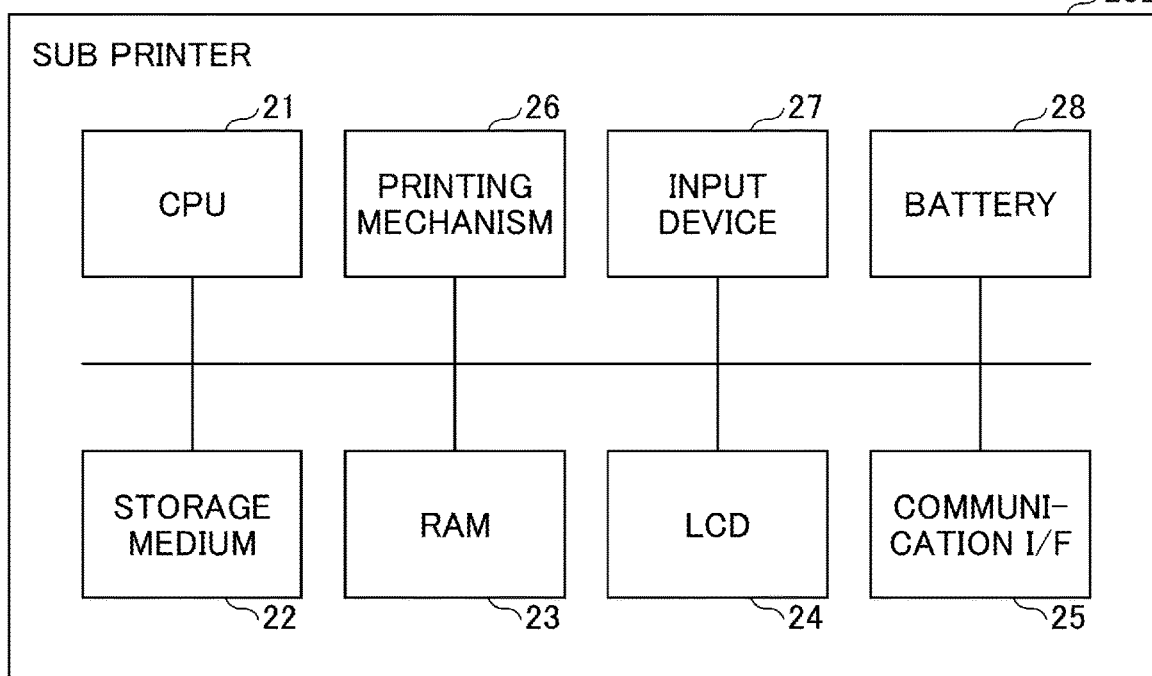

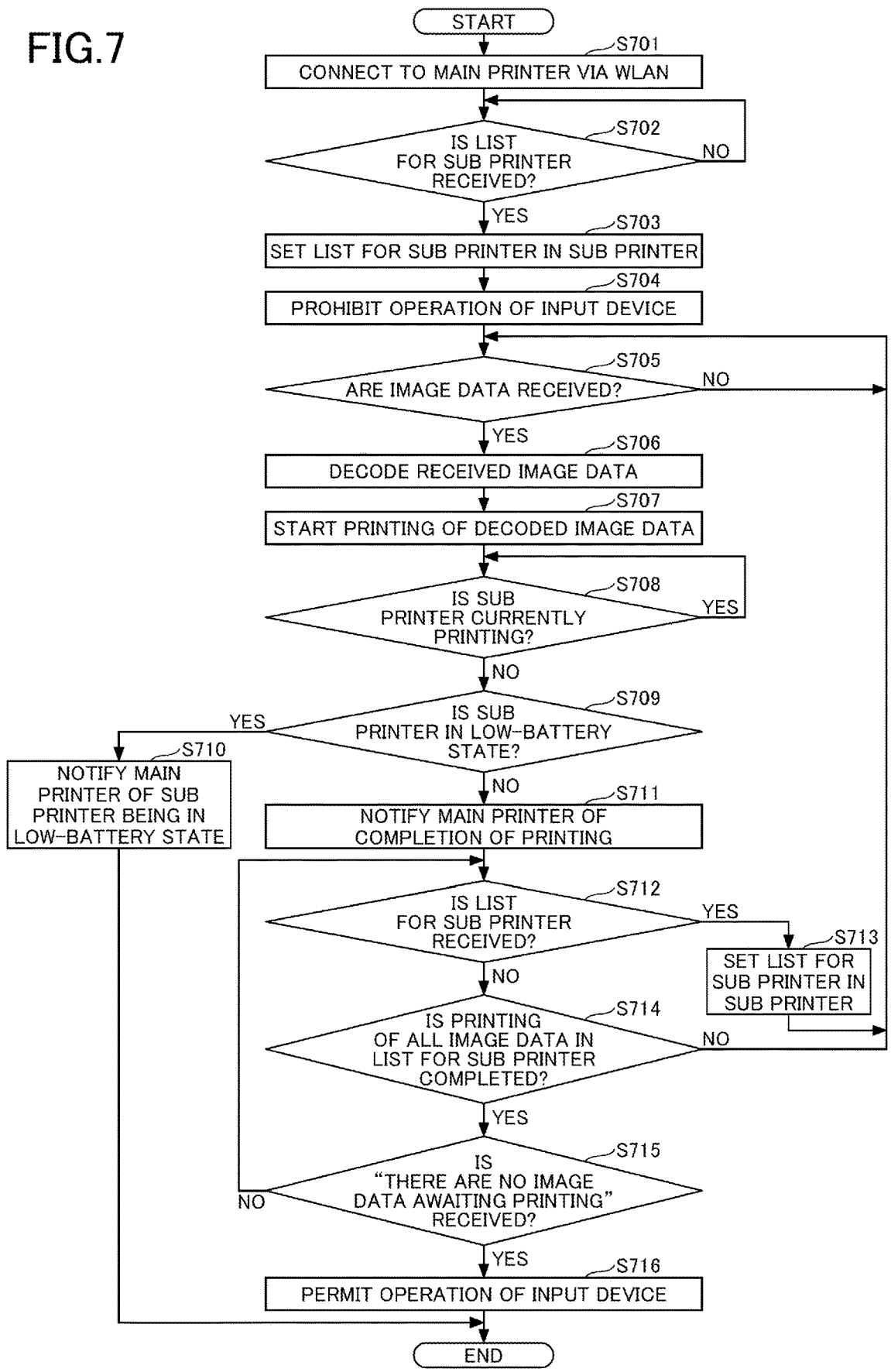

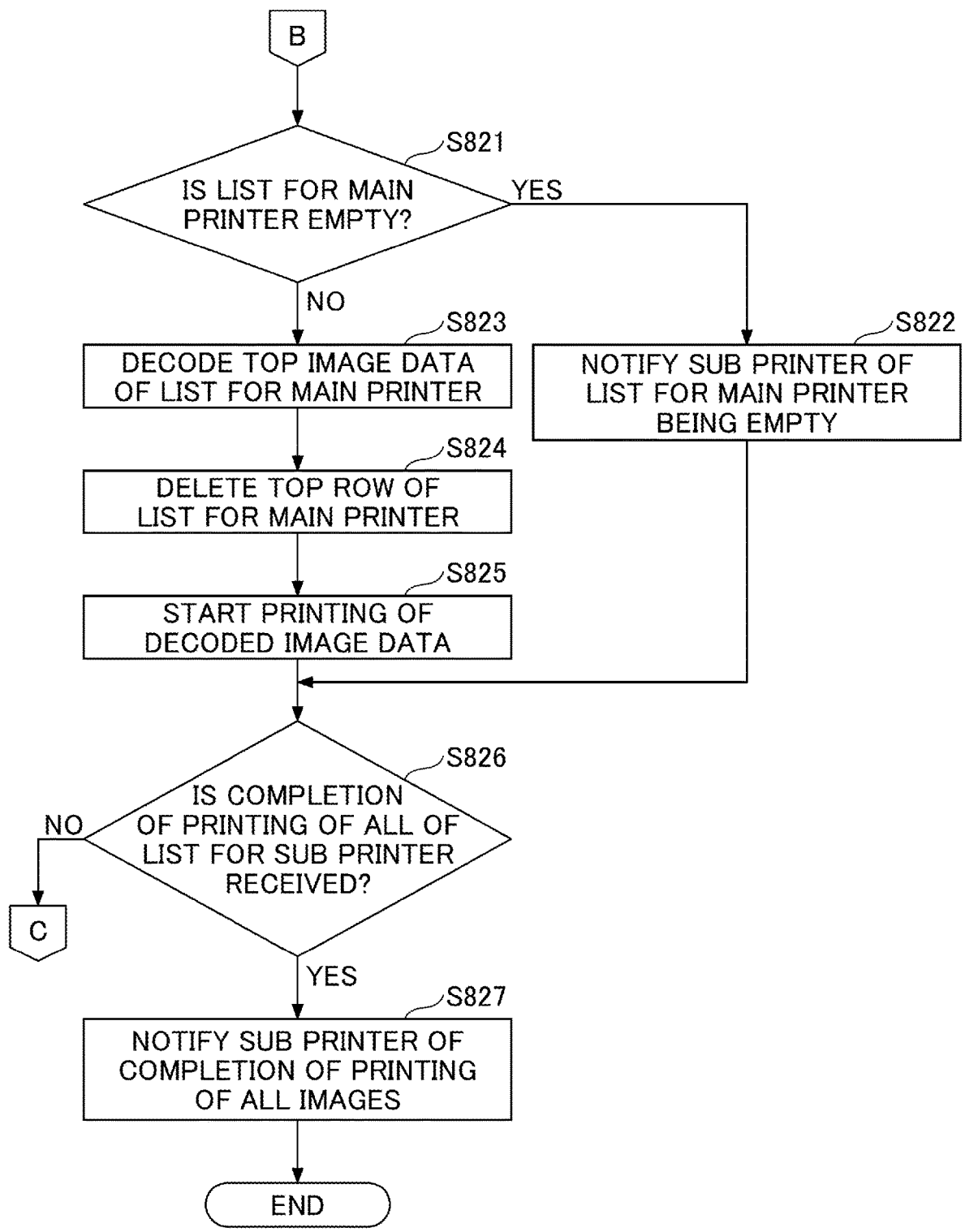

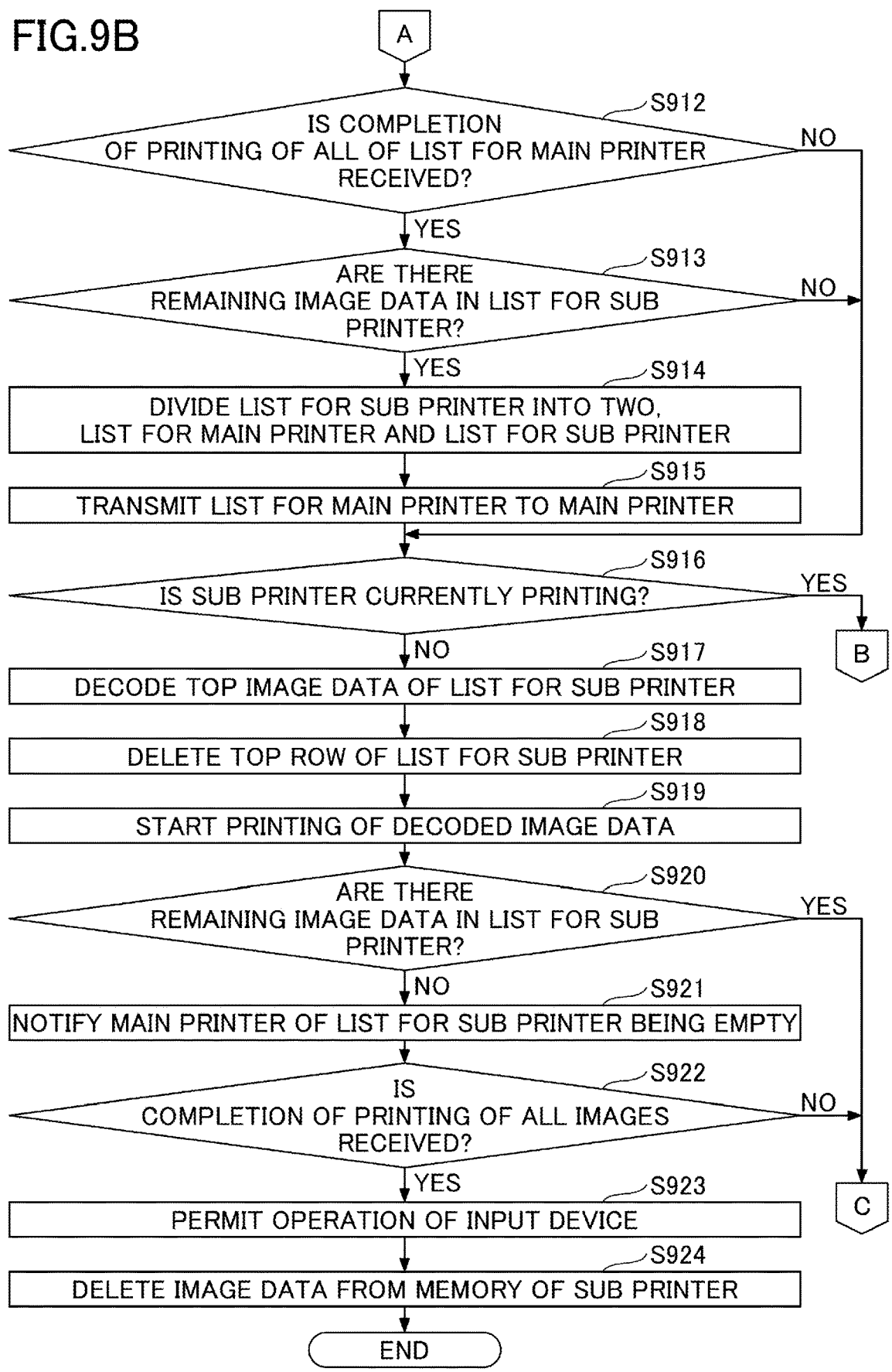

PRINTING SYSTEM AND SUB PRINTER

CROSS-REFERENCE TO RELATED APPLICATIONS

The present application is based on and claims priority to Japanese Patent Application No. 2022-173752 filed on Oct. 28, 2022, the entire contents of which are hereby incorporated by reference.

BACKGROUND

1. Field of the Invention

The present disclosure relates to printing systems and sub printers.

2. Description of the Related Art

Japanese Laid-Open Patent Publication No. 2004-220565 discloses a distributed printing system configured to control distributed printing by a plurality of printers via a distributed printing management server connected to the plurality of printers.

SUMMARY

A printing system according to one embodiment includes: a main printer configured to print an image sheet by sheet; a sub printer communicably connected to the main printer and configured to print an image sheet by sheet; and a storage medium that is configured to store image data of a plurality of images and from which the main printer is able to read out the image data. In response to changing of a state of the sub printer, the sub printer notifies the main printer of a changed state. The main printer regularly checks print situations of the main printer and the sub printer. In accordance with the print situations that are regularly checked, the main printer determines which of the printers is to be used for printing of an image for each of the image data of the plurality of images.

BRIEF DESCRIPTION OF DRAWINGS

FIG. 5 is a view illustrating a configuration of a printing system according to a second embodiment;

FIG. 7 is a flowchart illustrating a procedure of a printing process by a sub printer according to the second embodiment;

FIG. 8C is a flowchart illustrating a procedure of the printing process by the main printer according to the third embodiment;

FIG. 9B is a flowchart illustrating a procedure of the printing process by the sub printer according to the third embodiment.

DETAILED DESCRIPTION

Figure 1:
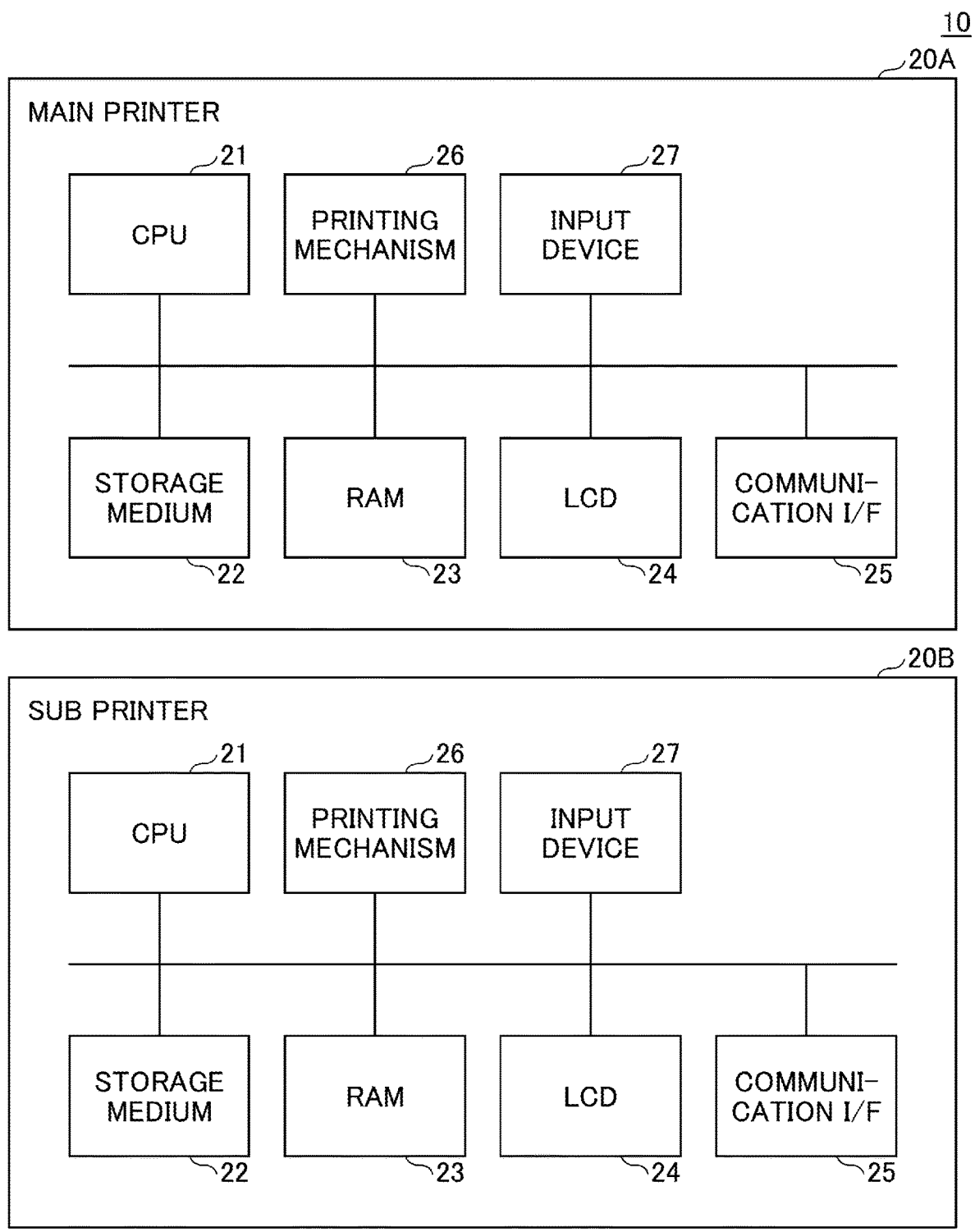
FIG. 1 is a view illustrating a configuration of a printing system according to a first embodiment.

The technique of Japanese Laid-Open Patent Publication No. 2004-220565 cannot appropriately distribute the load of printing of image data of a plurality of images to a plurality of printers without the use of, for example, a server device that controls distributed printing.

Hereinafter, referring to the drawings, one embodiment will be described.

First Embodiment (Configuration of Printing System 10)

FIG. 1 is a view illustrating a configuration of a printing system 10 according to the first embodiment. As illustrated in FIG. 1, the printing system 10 includes a main printer 20A and a sub printer 20B. Both of the main printer 20A and the sub printer 20B are relatively compact and portable printing devices dedicated to printing of images (photographs) (i.e., photo printers). The main printer 20A and the sub printer 20B are each configured to print an image (photograph) sheet by sheet.

The main printer 20A and the sub printer 20B are wirelessly communicably connected to each other. For example, of the plurality of printers included in the printing system 10, a printer that is operated by a user is the main printer 20A, and the other printer is the sub printer 20B. In other words, any one of the printers included in the printing system 10 can be the main printer 20A or the sub printer 20B, and the other printer can be the main printer 20A or the sub printer 20B.

Note that, according to the printing system 10 according to the first embodiment, the main printer 20A and the sub printer 20B are connected to each other in a one-to-one manner. That is, distributed printing can be performed between the main printer 20A and the sub printer 20B without the need of, for example, a server device that controls distributed printing.

Each of the main printer 20A and the sub printer 20B includes a central processing unit (CPU) 21, a storage medium 22, a random access memory (RAM) 23, a liquid crystal display (LCD) 24, a communication interface (I/F) 25, a printing mechanism 26, and an input device 27.

The CPU 21 is one example of a "control part", and controls a printing process by the printing system 10 by executing a program. For example, the CPU 21 reads out image data from the storage medium 22 and decodes the image data. Also, for example, the CPU 21 temporarily stores the decoded image data in the RAM 23.

The storage medium 22 stores image data of a plurality of images. Examples of the storage medium 22 include SD memory cards, universal serial bus (USB) memories, and smartphones, which are attachable to and detachable from devices. However, the storage medium 22 is not limited to the above. The storage medium 22 may be a built-in one in a device, such as a hard disk drive (HDD). Also, the storage medium 22 stores a printer driver that drives the main printer 20A and the sub printer 20B.

The RAM 23 temporarily stores various data (e.g., image data read out by the CPU 21 from the storage medium 22, and a list of image data).

The LCD 24 displays various information (e.g., a list of image data stored in the storage medium 22, a print setting screen, and a print situation obtained by the printing mechanism 26). The LCD 24 functions as a user interface (UI).

The communication I/F 25 performs wireless communication with external devices. For example, the main printer 20A can perform wireless communication with the sub printer 20B via the communication I/F 25. Also, for example, the sub printer 20B can perform wireless communication with the main printer 20A via the communication I/F 25. A wireless communication mode of the communication I/F 25 is, for example, Wireless LAN (WLAN).

The printing mechanism 26 prints an image on a sheet based on the image data decoded by the CPU 21. A printing mode of the printing mechanism 26 is, for example, a thermal transfer mode, an inkjet mode, or a laser mode.

In response to operation by a user, the input device 27 receives, from the user, an input of various information (e.g., print settings or instructions to perform printing). Examples of the input device 27 include switches, buttons, keys, and touch panels.

Note that, the main printer 20A and the sub printer 20B may be printers of the same type or different types. Also, the printing system 10 may include a plurality of sub printers 20B.

Also, the main printer 20A and the sub printer 20B may be connected to each other via a given wireless communication mode (e.g., BLUETOOTH (registered trademark)) other than WLAN. A wire-based connection may be established between the main printer 20A and the sub printer 20B with use of a communication cable.

(Procedure of a Process by the Printing System 10)

Figure 2:
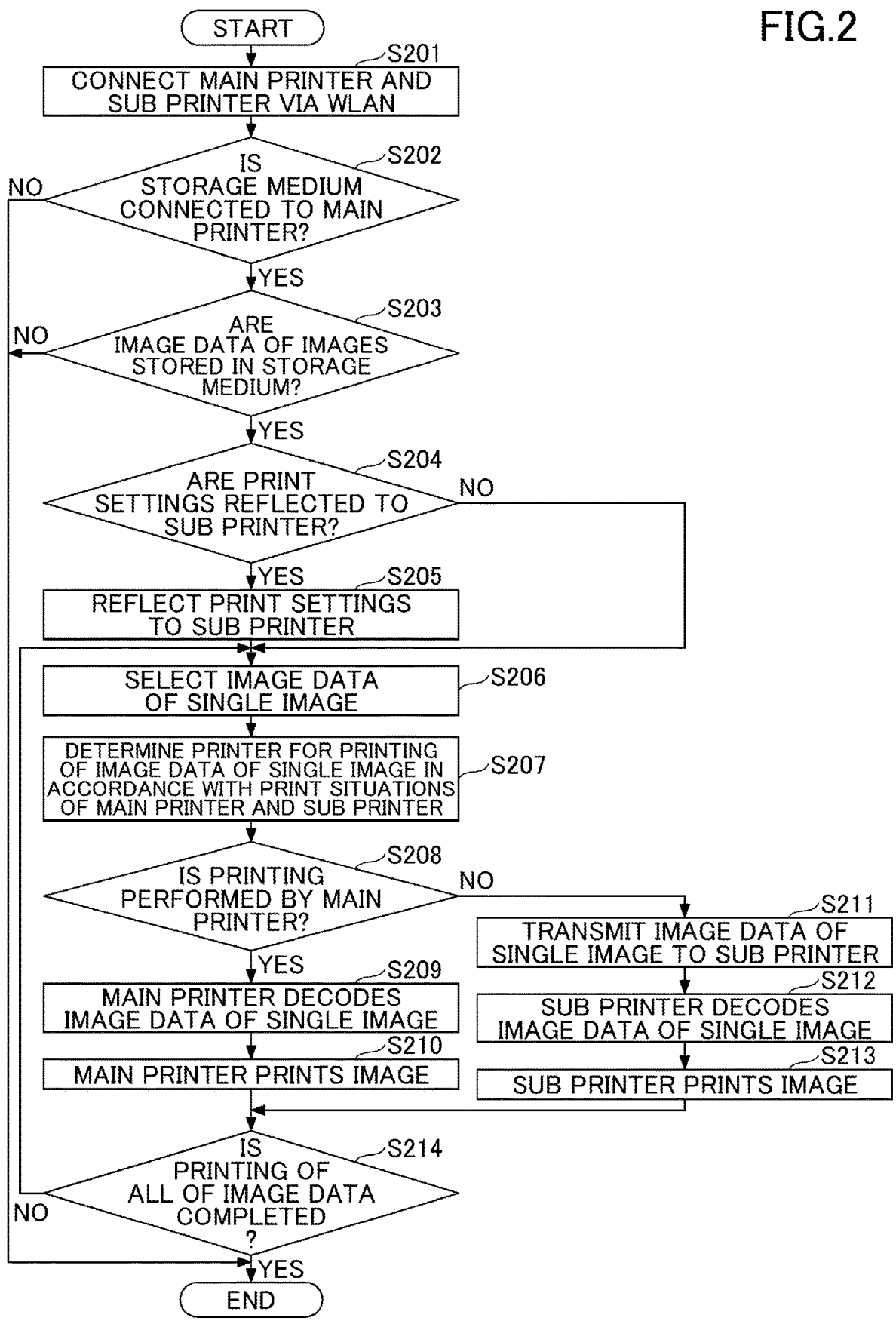
FIG. 2 is a flowchart illustrating a procedure of a printing process by the printing system according to the first embodiment.

FIG. 2 is a flowchart illustrating a procedure of a printing process by the printing system 10 according to the first embodiment.

First, the main printer 20A and the sub printer 20B are wirelessly communicably connected to each other via WLAN (step S201).

Next, the CPU 21 of the main printer 20A determines whether or not the storage medium 22 is connected to the main printer 20A (step S202).

In step S202, when it is determined that the storage medium 22 is not connected to the main printer 20A (step S202: NO), the printing system 10 ends a series of steps as illustrated in FIG. 2.

Meanwhile, when it is determined in step S202 that the storage medium 22 is connected to the main printer 20A (step S202: YES), the CPU 21 of the main printer 20A determines whether or not image data of a plurality of images are stored in the storage medium 22 (step S203).

When it is determined in step S203 that image data of a plurality of images are not stored in the storage medium 22 (step S203: NO), the printing system 10 ends a series of steps as illustrated in FIG. 2.

Meanwhile, when it is determined in step S203 that image data of a plurality of images are stored in the storage medium 22 (step S203: YES), the CPU 21 of the main printer 20A determines whether or not the print settings of the main printer 20A are reflected in the sub printer 20B (step S204).

Note that, specific examples of the print settings that are reflected from the main printer 20A to the sub printer 20B will be given as follows.

Image quality (e.g., white balance, hues, and brightness)
Black and white settings
Sepia settings
Bordered/borderless settings
Amount of extension in the case of borderless settings
Layout (e.g., N-up)
Data When it is determined in step S204 that the print settings of the main printer 20A are reflected to the sub printer 20B (step S204: YES), the CPU 21 of the main printer 20A reflects the print settings of the main printer 20A to the sub printer 20B through wireless communication via WLAN (step S205). Subsequently, the printing system 10 causes the flow to proceed to step S206.

When it is determined in step S204 that the print settings of the main printer 20A are not reflected to the sub printer 20B (step S204: NO), the printing system 10 causes the flow to proceed to step S206.

In step S206, the CPU 21 of the main printer 20A selects image data of a single image from the plurality images stored in the storage medium 22 of the main printer 20A (step S206).

Next, the CPU 21 of the main printer 20A determines a printer used for printing of the image data of a single image selected in step S206 in accordance with print situations of the main printer 20A and the sub printer 20B (step S207).

Next, based on the determination in step S207, the CPU 21 of the main printer 20A determines whether or not the image data of a single image selected in step S206 is printed by the main printer 20A (step S208).

When it is determined in step S208 that the image data of a single image is printed by the main printer 20A (step S208: YES), the CPU 21 of the main printer 20A decodes the image data of a single image selected in step S206 (step S209). Then, the printing mechanism 26 of the main printer 20A prints an image using the image data of a single image decoded in step S209 (step S210). Then, the printing system 10 causes the flow to proceed to step S214.

Meanwhile, when it is determined in step S208 that the image data of a single image is not printed by the main printer 20A (step S208: NO), the CPU 21 of the main printer 20A transmits the image data of a single image selected in step S206 and a printing command to the sub printer 20B through wireless communication via WLAN (step S211). Then, the CPU 21 of the sub printer 20B decodes the image data of a single image transmitted from the main printer 20A (step S212). Moreover, the printing mechanism 26 of the sub printer 20B prints an image using the image data of a single image decoded in step S212 (step S213). The printing system 10 causes the flow to proceed to step S214.

In step S214, the CPU 21 of the main printer 20A determines whether or not printing of all of the image data stored in the storage medium 22 is completed (step S214).

When it is determined in step S214 that printing of all of the image data stored in the storage medium 22 is not completed (step S214: NO), the printing system 10 returns the flow to step S206.

Meanwhile, when it is determined in step S214 that printing of all of the image data stored in the storage medium 22 is completed (step S214: YES), the printing system 10 ends a series of steps as illustrated in FIG. 2.

(Procedure of a Process by the Main Printer 20A)

Figure 3:
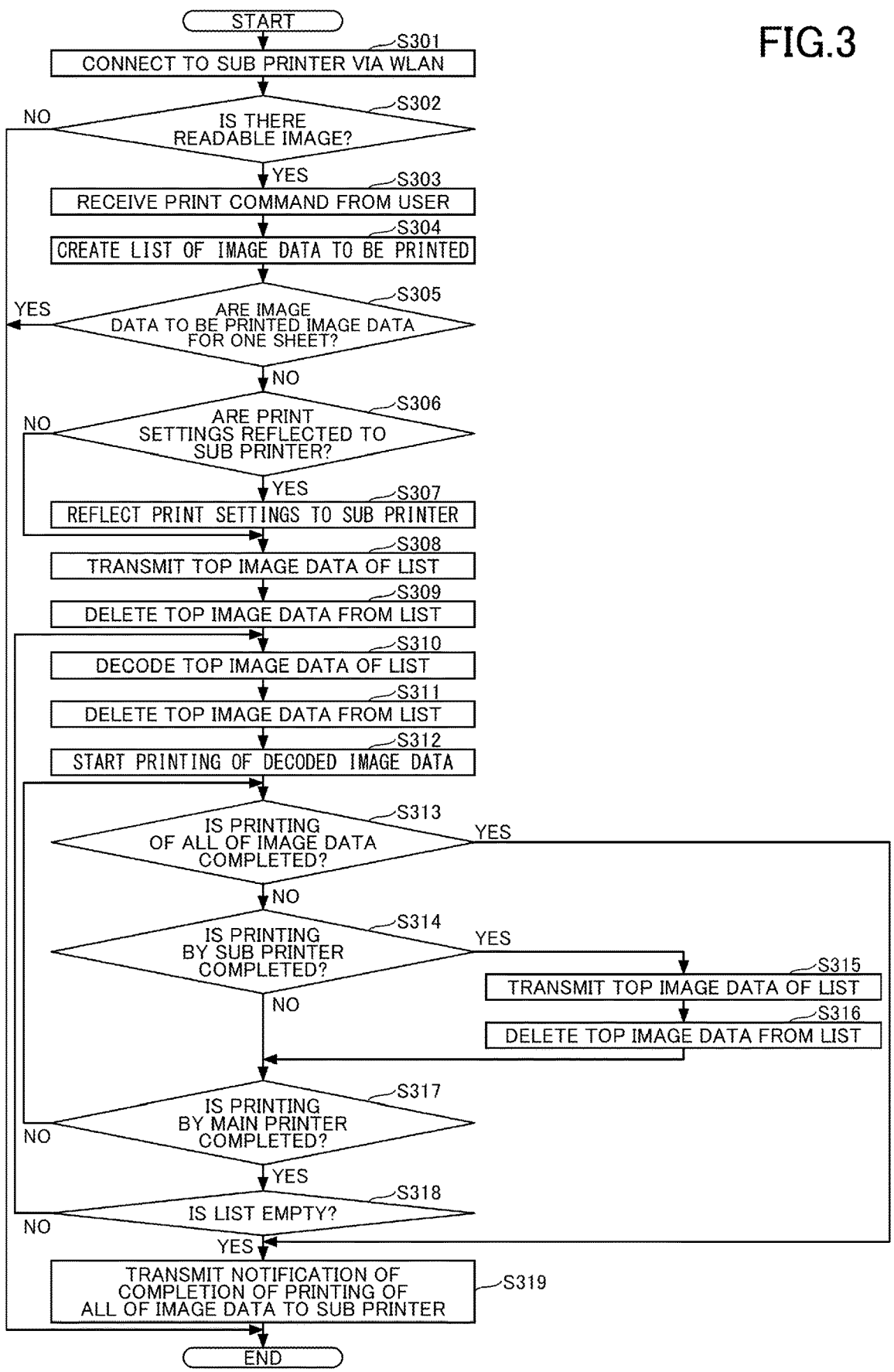
FIG. 3 is a flowchart illustrating a procedure of a printing process by a main printer according to the first embodiment.

FIG. 3 is a flowchart illustrating a procedure of a printing process by the main printer 20A according to the first embodiment.

First, the communication I/F 25 wirelessly communicably connects to the sub printer 20B via WLAN (step S301).

Next, the CPU 21 determines whether or not there are any image data that can be read out to the main printer 20A (step S302). Here, the case in which "there are any image data that can be read out to the main printer 20A" refers to, for example, a case in which image data are stored in the storage medium 22 (e.g., a SD memory card, a USB memory, and a smartphone) connected to the main printer 20A. Note that, a plurality of storage media 22 may be connected to the main printer 20A. In this case, the CPU 21 may read out image data from each of the plurality of storage media 22 connected to the main printer 20A. Also, when the storage medium 22 is a smartphone, the CPU 21 preferably copies the image data stored in the smartphone in a built-in memory (RAM 23) of the main printer 20A.

When it is determined in step S302 that there are no image data that can be read out to the main printer 20A (step S302: NO), the main printer 20A ends a series of steps as illustrated in FIG. 3.

Meanwhile, when it is determined in step S302 that there are any image data that can be read out to the main printer 20A (step S302: YES), the CPU 21 receives a printing command from a user (step S303). Note that, the printing command from the user may be made through operation of the main printer 20A by the user, or may be made through operation by the user of the smartphone connected to the main printer 20A.

Next, the CPU 21 creates a list of image data to be printed (step S304). The list defines priority of the image data to be printed. The list shows, for example, an order of printing, a storage site (name of a folder), and a name of a file, for each of the image data for a single sheet. Note that, the list may automatically include all of the plurality of images stored in the storage medium 22, or may include a plurality of images selected by a user from the plurality of images stored in the storage medium 22.

Next, the CPU 21 determines whether or not the image data to be printed (i.e., image data included in the list created in step S304) are image data for one sheet (step S305).

When it is determined in step S305 that the image data to be printed are image data for one sheet (step S305: YES), the main printer 20A may print the image data by itself (i.e., distributed printing is not necessary) and ends a series of steps as illustrated in FIG. 3.

Meanwhile, when it is determined in step S305 that the image data to be printed are not image data for one sheet (step S305: NO), the CPU 21 determines whether or not the print settings of the main printer 20A are reflected to the sub printer 20B (step S306).

When it is determined in step S306 that the print settings of the main printer 20A are reflected to the sub printer 20B (step S306: YES), the CPU 21 reflects the print settings of the main printer 20A to the sub printer 20B through wireless communication via WLAN (step S307). Subsequently, the main printer 20A causes the flow to proceed to step S308.

When it is determined in step S306 that the print settings of the main printer 20A are not reflected to the sub printer 20B (step S306: NO), the main printer 20A causes the flow to proceed to step S308.

In step S308, the CPU 21 transmits the top image data of the list created in step S304 (i.e., the image data that are the highest in priority at this time) to the sub printer 20B through wireless communication via WLAN (step S308).

Next, the CPU 21 deletes the image data transmitted in step S308 from the list created in step S304 (step S309).

Next, the CPU 21 decodes the top image data of the list created in step S304 (i.e., the image data that are the highest in priority at this time) (step S310).

Next, the CPU 21 deletes the image data decoded in step S310 from the list created in step S304 (step S311).

Next, the printing mechanism 26 starts printing of the image data decoded in step S310 (step S312).

Next, the CPU 21 determines whether or not printing of all of the image data included at the time of creating of the list in step S304 is completed (step S313).

When it is determined in step S313 that printing of all of the image data is completed (step S313: YES), the CPU 21 transmits, to the sub printer 20B, a notification of completion of printing of all of the image data, through wireless communication via WLAN (step S319). Subsequently, the main printer 20A ends a series of steps as illustrated in FIG. 3.

Meanwhile, when it is determined in step S313 that printing of all of the image data is not completed (step S313: NO), the CPU 21 determines whether or not printing by the sub printer 20B is completed (step S314).

When it is determined in step S314 that printing by the sub printer 20B is completed (step S314: YES), the CPU 21 transmits, to the sub printer 20B, the top image data of the list created in step S304 through wireless communication via WLAN (step S315). Then, the CPU 21 deletes the top image data from the list created in step S304 (step S316). Subsequently, the main printer 20A causes the flow to proceed to step S317.

Meanwhile, when it is determined in step S314 that printing by the sub printer 20B is not completed (step S314: NO), the main printer 20A causes the flow to proceed to step S317.

In step S317, the CPU 21 determines whether or not printing by the main printer 20A is completed (step S317).

When it is determined in step S317 that printing by the main printer 20A is not completed (step S317: NO), the main printer 20A returns the flow to step S313.

Meanwhile, when it is determined in step S317 that printing by the main printer 20A is completed (step S317: YES), the CPU 21 determines whether or not the list created in step S304 is empty (step S318).

When it is determined in step S318 that the list is not empty (step S318: NO), the main printer 20A returns the flow to step S310.

Meanwhile, when it is determined in step S318 that the list is empty (step S318: YES), the CPU 21 transmits, to the sub printer 20B, a notification of completion of printing of all of the image data, through wireless communication via WLAN (step S319). Subsequently, the main printer 20A ends a series of steps as illustrated in FIG. 3.

Note that, in the case of receiving a new printing command from a user before completion of the printing of all of the image data included at the time of creating of the list, the CPU 21 of the main printer 20A may add, to the last part of the list, the image data designated to be printed by the new printing command.

(Procedure of a Process by the Sub Printer 20B)

Figure 4:
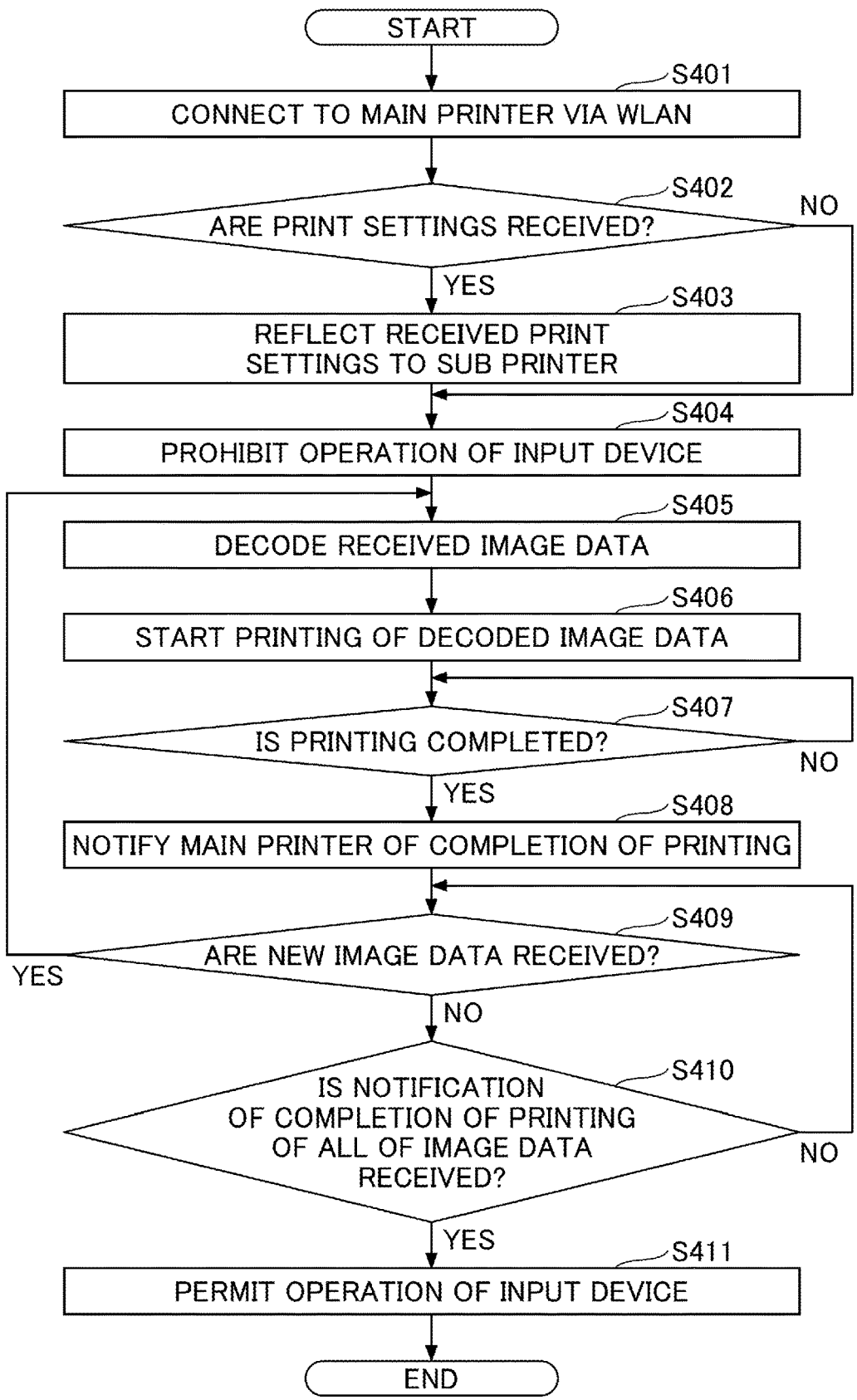
FIG. 4 is a flowchart illustrating a procedure of a printing process by a sub printer according to the first embodiment.
Figure 6A:
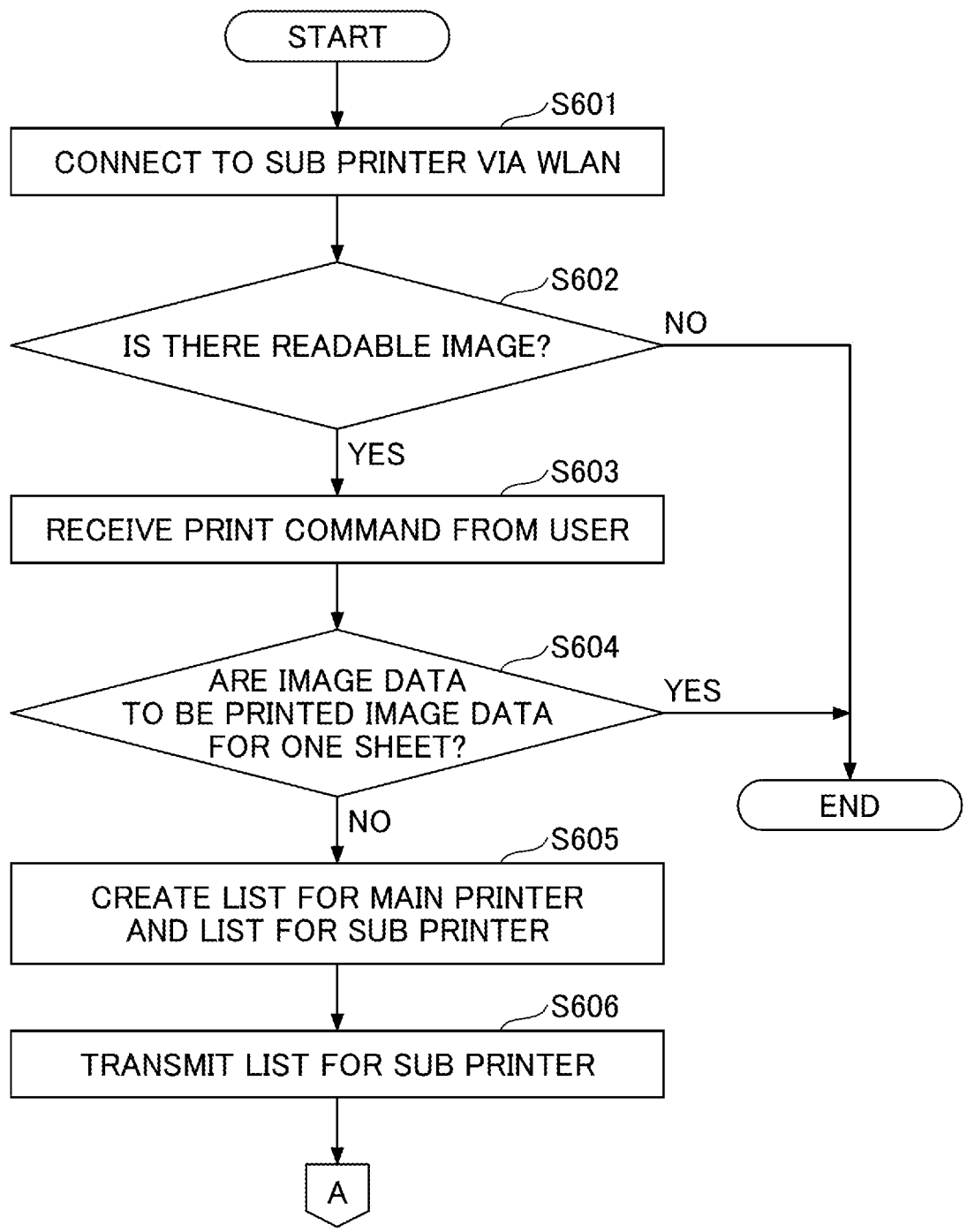
FIG. 6A is a flowchart illustrating a procedure of a printing process by a main printer according to the second embodiment.
Figure 6B:
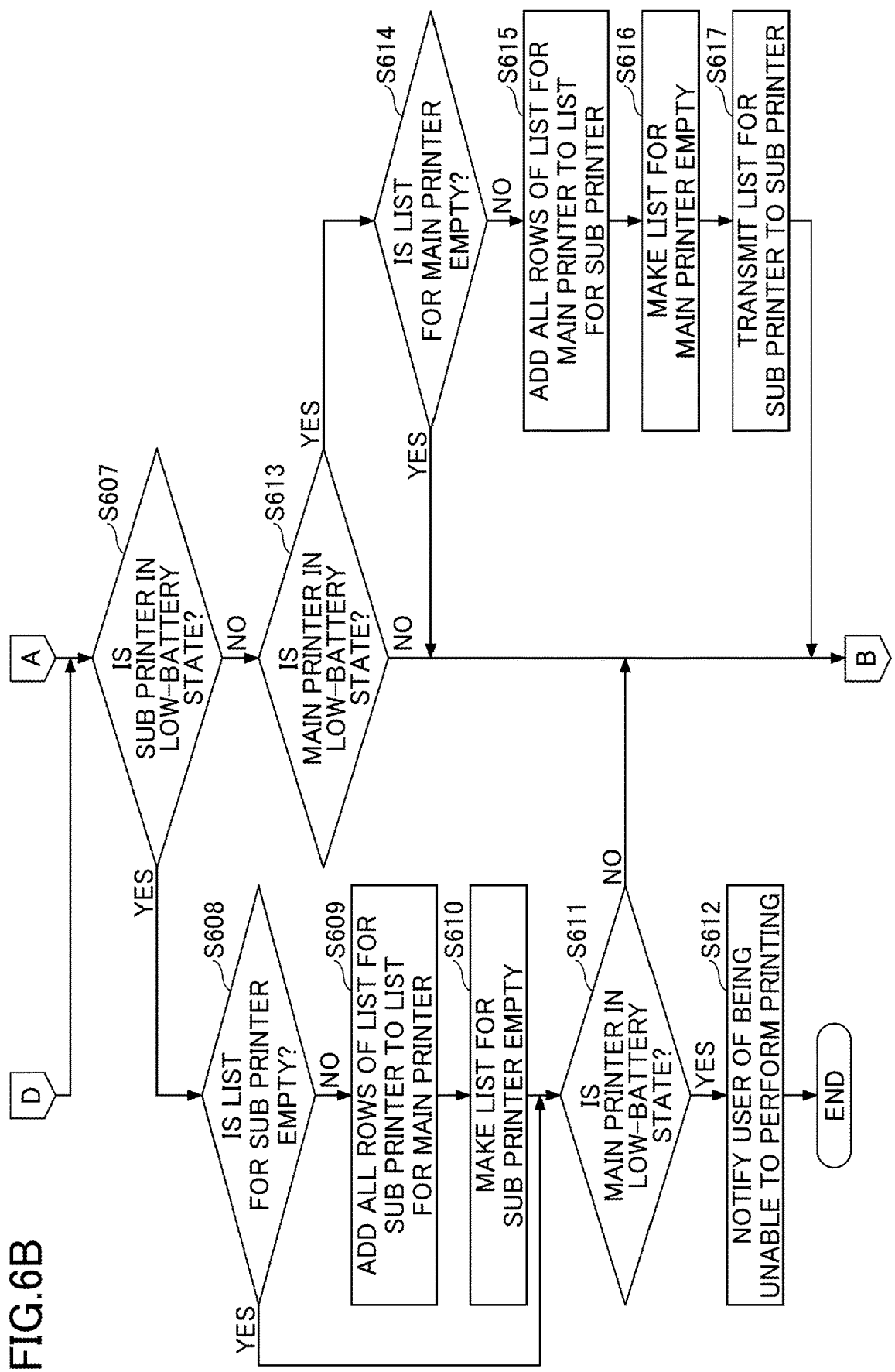
FIG. 6B is a flowchart illustrating a procedure of the printing process by the main printer according to the second embodiment.
Figure 6C:
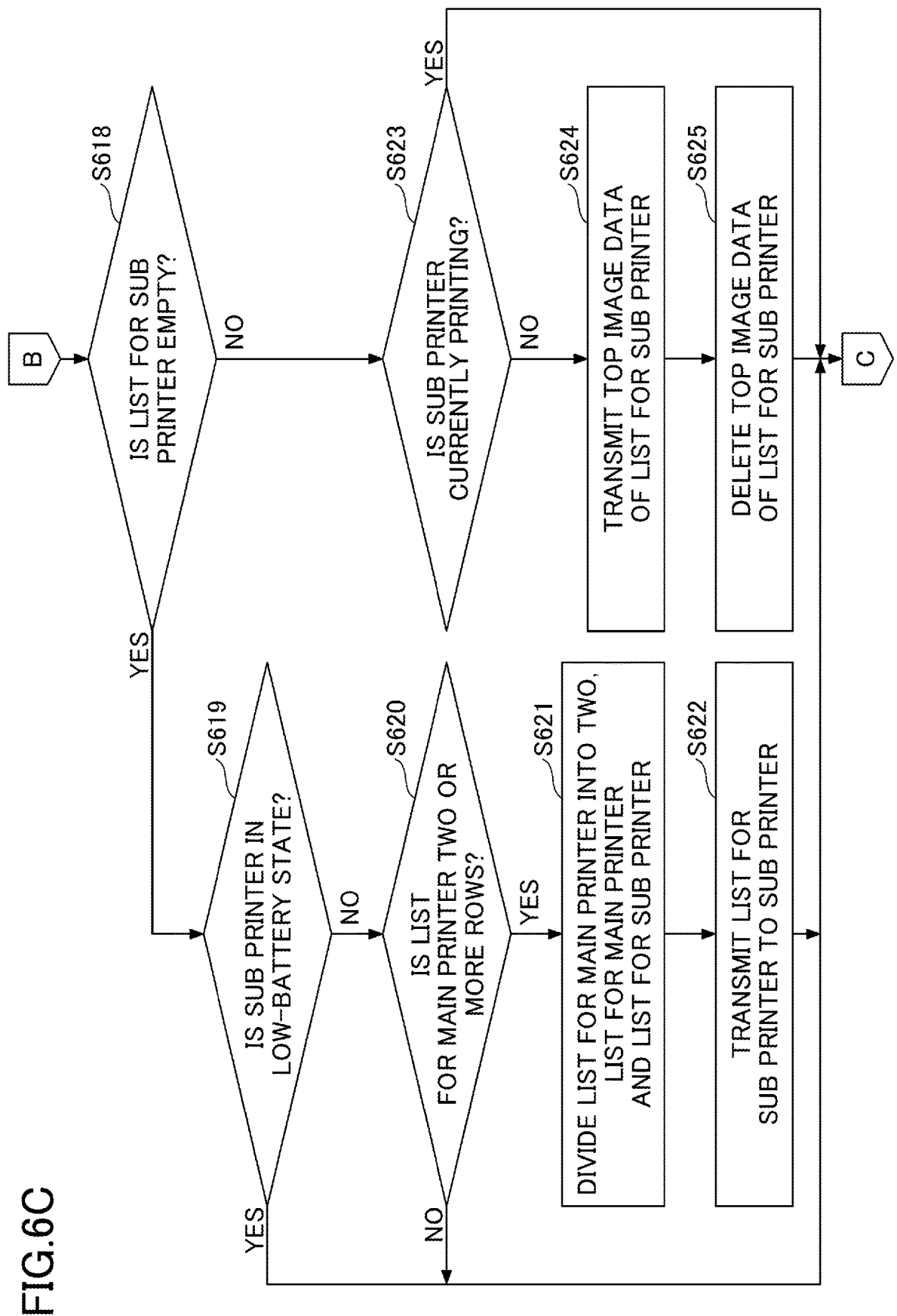
FIG. 6C is a flowchart illustrating a procedure of the printing process by the main printer according to the second embodiment.
Figure 6D:
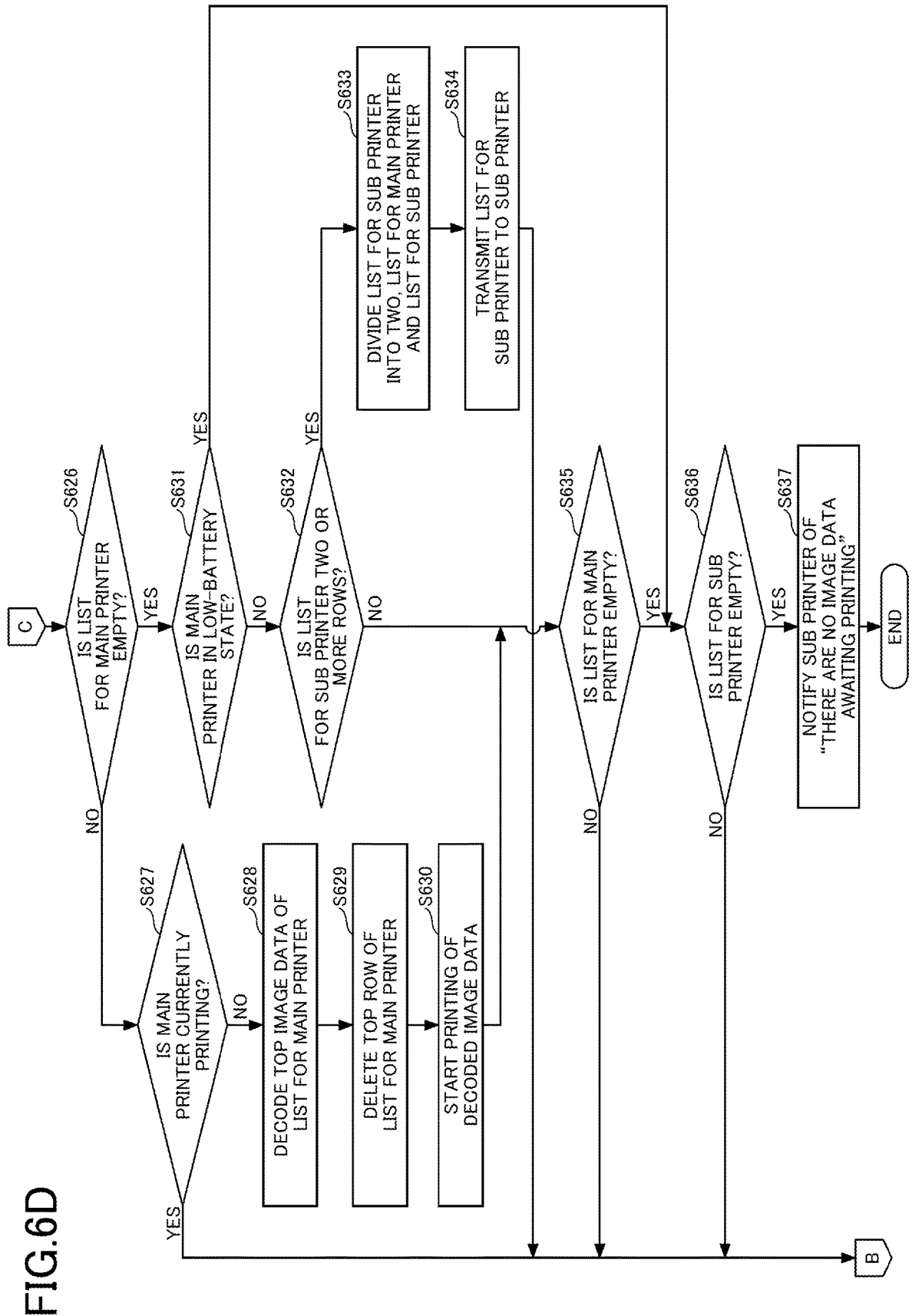
FIG. 6D is a flowchart illustrating a procedure of the printing process by the main printer according to the second embodiment.

FIG. 4 is a flowchart illustrating a procedure of a printing process by the sub printer 20B according to the first embodiment.

First, the communication I/F 25 wirelessly communicably connects to the main printer 20A via WLAN (step S401).

Next, the CPU 21 determines whether or not print settings are received from the main printer 20A (step S402).

When it is determined in step S402 that print settings are received from the main printer 20A (step S402: YES), the CPU 21 reflects, to the sub printer 20B, the print settings received from the main printer 20A (step S403). Subsequently, the sub printer 20B causes the flow to proceed to step S404.

Meanwhile, when it is determined in step S402 that print settings are not received from the main printer 20A (step S402: NO), the sub printer 20B causes the flow to proceed to step S404.

In step S404, the CPU 21 prohibits operation of the input device 27 (step S404).

Next, the CPU 21 decodes the image data received from the main printer 20A (step S405).

Next, the printing mechanism 26 starts printing of the image data decoded in step S405 (step S406).

Next, the CPU 21 determines whether or not printing by the sub printer 20B is completed (step S407).

When it is determined in step S407 that printing by the sub printer 20B is not completed (step S407: NO), the sub printer 20B performs step S407 again.

Meanwhile, when it is determined in step S407 that printing by the sub printer 20B is completed (step S407: YES), the CPU 21 notifies the main printer 20A of completion of the printing through wireless communication via WLAN (step S408).

Next, the CPU 21 determines whether or not new image data are received from the main printer 20A (step S409).

When it is determined in step S409 that new image data are received (step S409: YES), the sub printer 20B returns the flow to step S405.

Meanwhile, when it is determined in step S409 that new image data are not received (step S409: NO), the CPU 21 determines that a notification of completion of the printing of all of the image data is received from the main printer 20A (step S410).

When it is determined in step S410 that a notification of completion of the printing of all of the image data is not received (step S410: NO), the sub printer 20B returns the flow to step S409.

Meanwhile, when it is determined in step S410 that a notification of completion of the printing of all of the image data is received (step S410: YES), the CPU 21 permits operation of the input device 27 (step S411). Subsequently, the sub printer 20B ends a series of steps as illustrated in FIG. 4.

(Effects)

As described above, the printing system 10 according to the first embodiment includes: the main printer 20A configured to print the image; the sub printer 20B communicably connected to the main printer 20A and configured to print the image; and the storage medium 22 that is configured to store the image data of the plurality of images and from which the main printer 20A is able to read out the image data. The main printer 20A regularly checks the print situations of the main printer 20A and the sub printer 20B. In accordance with the print situations that are regularly checked, the main printer determines which of the printers is to be used for printing of an image for each of the image data of the plurality of images.

Thereby, even if, for example, any one of the printers has trouble during printing (e.g., running out of ink) or there is difference in printing speed between the printers, the printing system 10 according to the first embodiment can appropriately distribute the load of the printing of the image data of the plurality of images to the main printer 20A and the sub printer 20B.

In particular, according to the printing system 10 according to the first embodiment, the main printer 20A is responsible for main control in relation to the printing of the image data of the plurality of images by the main printer 20A and the sub printer 20B, and thus it is possible to appropriately distribute the load of the printing of the image data of the plurality of images to the main printer 20A and the sub printer 20B without the use of, for example, a server device that controls distributed printing.

Specifically, according to the printing system 10 according to the first embodiment, the main printer 20A creates a list that defines priority of the image data of the plurality of images. Every time the main printer 20A completes printing of the image data of a single image, the main printer 20A prints the next image data of a single image that is the highest in priority in the list, and deletes the next image data of the single image from the list. Every time the sub printer 20B completes printing of the image data of a single image, the sub printer 20B transmits a signal of completion of the printing to the main printer 20A. Every time the main printer 20A receives the signal of the completion of the printing, the main printer 20A causes the sub printer 20B to print next image data of a single image that is the highest in priority in the list, and deletes the next image data of the single image from the list.

Thereby, with the printing system 10 according to the first embodiment, an awaiting-for-printing situation does not arise because a printing instruction of new image data is not given while image data are being printed, in any of the main printer 20A and the sub printer 20B. Therefore, according to the printing system 10 according to the first embodiment, it is possible to appropriately distribute the load of the printing of the image data of the plurality of images to the main printer 20A and the sub printer 20B.

Also, according to the printing system 10 according to the first embodiment, the main printer 20A decodes the image data of the image that is determined to be printed using the main printer 20A, and the sub printer 20B decodes the image data of the image that is determined to be printed using the sub printer 20B.

Thereby, the printing system 10 according to the first embodiment can distribute the load of the decoding of the image data of the plurality of images to the main printer 20A and the sub printer 20B.

Also, according to the printing system 10 according to the first embodiment, each of the main printer 20A and the sub printer 20B includes the input device 27, and the operation by the input device 27 of the sub printer 20B is prohibited from the start of the printing of the image data of the plurality of images until completion of the printing of all of the image data of the plurality of images.

Thereby, the printing system 10 according to the first embodiment can prevent malfunction by integrating, into the main printer 20A, the main control in relation to the printing of the image data of the plurality of images by the main printer 20A and the sub printer 20B.

Also, according to the printing system 10 according to the first embodiment, the main printer 20A reflects the print settings of the main printer 20A to the sub printer 20B, and the sub printer 20B can print an image based on the reflected print settings.

Thereby, according to the printing system according to the first embodiment, the main printer 20A and the sub printer 20B are able to perform printing under the common print settings without a user manually performing print settings of the sub printer 20B.

Also, according to the printing system 10 according to the first embodiment, the main printer 20A and the sub printer 20B are wirelessly communicably connected to each other via Wireless LAN or BLUETOOTH.

Thereby, the printing system 10 according to the first embodiment can relatively readily communicably connect the main printer 20A and the sub printer 20B to each other without the use of a communication cable.

(Examples of Connection of a Plurality of Sub Printers 20B)

The examples of FIG. 1 to FIG. 4 illustrate that a single sub printer 20B is connected to the main printer 20A; however, this is by no means a limitation. A plurality of sub printers 20B may be connected to the main printer 20A.

In this case, the main printer 20A can transmit image data sheet by sheet, in accordance with the priority in the list, to each of the plurality of sub printers 20B, thereby causing the sub printer 20B to print an image sheet by sheet. Every time any one of the sub printers 20B completes printing, the main printer 20A can transmit image data for the next sheet to the sub printer 20B that completes the printing, thereby causing the sub printer 20B to print the next image.

Therefore, with the printing system 10, an awaiting-for-printing situation does not arise because a printing instruction of new image data is not given while image data are being printed, in any of the main printer 20A and the plurality of sub printers 20B. Thus, according to the printing system 10, it is possible to appropriately distribute the load of the printing of the image data of the plurality of images to the main printer 20A and the plurality of sub printers 20B.

Second Embodiment (Configuration of Printing System 10-2)

FIG. 5 is a view illustrating a configuration of a printing system 10-2 according to the second embodiment. As illustrated in FIG. 5, the printing system 10-2 according to the second embodiment is different from the printing system 10 according to the first embodiment in that each of the main printer 20A and the sub printer 20B includes a battery 28.

The battery 28 accumulates and supplies electric power for driving the device. As the battery 28, for example, various secondary batteries that are rechargeable (e.g., a lithium ion secondary battery or a lithium ion polymer secondary battery) are used.

The main printer 20A and the sub printer 20B, each including the battery 28, can be driven by the electric power supplied from the battery 28.

Note that, in each of the main printer 20A and the sub printer 20B, the CPU 21 regularly monitors the state of the battery 28 (e.g., voltage or temperature) and can detect changes in the state of the battery 28 (e.g., low battery).

(Procedure of a Process by the Main Printer 20A)

FIG. 6A to FIG. 6D are flowcharts illustrating a procedure of a printing process by the main printer 20A according to the second embodiment.

First, the communication I/F 25 wirelessly communicably connects to the sub printer 20B via WLAN (step S601).

Next, the CPU 21 determines whether or not there are any image data that can be read out to the main printer 20A (step S602).

When it is determined in step S602 that there are no image data that can be read out to the main printer 20A (step S602: NO), the main printer 20A ends a series of steps as illustrated in FIG. 6A to FIG. 6D.

Meanwhile, when it is determined in step S602 that there are any image data that can be read out to the main printer 20A (step S602: YES), the CPU 21 receives a printing command from a user (step S603).

Next, the CPU 21 determines whether or not the image data to be printed are image data for one sheet (step S604).

When it is determined in step S604 that the image data to be printed are image data for one sheet (step S604: YES), the main printer 20A may print the image data by itself (i.e., distributed printing is not necessary) and ends a series of steps as illustrated in FIG. 6A to FIG. 6D.

Meanwhile, when it is determined in step S604 that the image data to be printed are not image data for one sheet (step S604: NO), the CPU 21 creates a list for the main printer and a list for the sub printer (step S605).

The list for the main printer defines priority of the image data to be printed by the main printer 20A. The list for the sub printer defines priority of the image data to be printed by the sub printer 20B. The list for the main printer and the list for the sub printer show, for example, an order of printing, a storage site (name of a folder), and a name of a file, for each of the image data for a single sheet. For example, the CPU 21 includes, in the list for the main printer, half the image data of the plurality of images to be printed, and includes, in the list for the sub printer, the other half of the image data of the plurality of images to be printed.

Next, the CPU 21 transmits, to the sub printer 20B, the list for the sub printer that is created in step S605, through wireless communication via WLAN (step S606).

Next, the CPU 21 determines whether or not the sub printer 20B is in a low-battery state (step S607).

When it is determined in step S607 that the sub printer 20B is in a low-battery state (step S607: YES), the CPU 21 determines whether or not the list for the sub printer is empty (step S608).

When it is determined in step S608 that the list for the sub printer is empty (step S608: YES), the main printer 20A causes the flow to proceed to step S611.

Meanwhile, when it is determined in step S608 that the list for the sub printer is not empty (step S608: NO), the CPU 21 adds all of the rows of the list for the sub printer to the list for the main printer (step S609). Then, the CPU 21 makes the list for the sub printer empty (step S610). Subsequently, the main printer 20A causes the flow to proceed to step S611.

In step S611, the CPU 21 determines whether or not the main printer 20A is in a low-battery state (step S611).

When it is determined in step S611 that the main printer 20A is not in a low-battery state (step S611: NO), the main printer 20A causes the flow to proceed to step S618.

Meanwhile, when it is determined in step S611 that the main printer 20A is in a low-battery state (step S611: YES), the CPU 21 notifies a user of being unable to perform printing (step S612). Subsequently, the main printer 20A ends a series of steps as illustrated in FIG. 6A to FIG. 6D.

When it is determined in step S607 that the sub printer 20B is not in a low-battery state (step S607: NO), the CPU 21 determines whether or not the main printer 20A is in a low-battery state (step S613).

When it is determined in step S613 that the main printer 20A is not in a low-battery state (step S613: NO), the main printer 20A causes the flow to proceed to step S618.

Meanwhile, when it is determined in step S613 that the main printer 20A is in a low-battery state (step S613: YES), the CPU 21 determines whether or not the list for the main printer is empty (step S614).

When it is determined in step S614 that the list for the main printer is empty (step S614: YES), the main printer 20A causes the flow to proceed to step the S618.

Meanwhile, when it is determined in step S614 that the list for the main printer is not empty (step S614: NO), the CPU 21 adds all of the rows of the list for the main printer to the list for the sub printer (step S615). Then, the CPU 21 makes the list for the main printer empty (step S616). Moreover, the CPU 21 transmits, to the sub printer 20B, the list for the sub printer to which all of the rows of the list for the main printer are added in step S615 (step S617). Subsequently, the main printer 20A causes the flow to proceed to step S618.

In step S618, the CPU 21 determines whether or not the list for the sub printer is empty (step S618).

When it is determined in step S618 that the list for the sub printer is empty (step S618: YES), the CPU 21 determines whether or not the sub printer 20B is in a low-battery state (step S619).

When it is determined in step S619 that the sub printer 20B is in a low-battery state (step S619: YES), the main printer 20A causes the flow to proceed to step S626.

Meanwhile, when it is determined in step S619 that the sub printer 20B is not in a low-battery state (step S619: NO), the CPU 21 determines whether or not the list for the main printer is two or more rows (step S620).

When it is determined in step S620 that the list for the main printer is not two or more rows (step S620: NO), the main printer 20A causes the flow to proceed to step S626.

Meanwhile, when it is determined in step S620 that the list for the main printer is two or more rows (step S620: YES), the CPU 21 divides the list for the main printer into two, thereby creating a list for the main printer and a list for the sub printer (step S621).

Then, the CPU 21 transmits, to the sub printer 20B, the list for the sub printer that is created in step S621, through wireless communication via WLAN (step S622). Subsequently, the main printer 20A causes the flow to proceed to step S626.

When it is determined in step S618 that the list for the sub printer is not empty (step S618: NO), the CPU 21 determines whether or not the sub printer 20B is currently printing (step S623).

When it is determined in step S623 that the sub printer 20B is currently printing (step S623: YES), the main printer 20A causes the flow to proceed to step S626.

Meanwhile, when it is determined in step S623 that the sub printer 20B is not currently printing (step S623: NO), the CPU 21 transmits, to the sub printer 20B, the top image data of the list for the sub printer, through wireless communication via WLAN (step S624).

Then, the CPU 21 deletes the top row of the list for the sub printer (step S625). Subsequently, the main printer 20A causes the flow to proceed to step S626.

In step S626, the CPU 21 determines whether or not the list for the main printer is empty (step S626).

When it is determined in step S626 that the list for the main printer is not empty (step S626: NO), the CPU 21 determines whether or not the main printer 20A is currently printing (step S627).

When it is determined in step S627 that the main printer 20A is currently printing (step S627: YES), the main printer 20A returns the flow to step S607.

Meanwhile, when it is determined in step S627 that the main printer 20A is not currently printing (step S627: NO), the CPU 21 decodes the top image data of the list for the main printer (step S628).

Then, the CPU 21 deletes the top row of the list for the main printer (step S629). Moreover, the printing mechanism 26 starts printing of the image data decoded in step S628 (step S630). Subsequently, the main printer 20A causes the flow to proceed to step S635.

When it is determined in step S626 that the list for the main printer is empty (step S626: YES), the CPU 21 determines whether or not the main printer 20A is in a low-battery state (step S631).

When it is determined in step S631 that the main printer 20A is in a low-battery state (step S631: YES), the main printer 20A causes the flow to proceed to step S637.

Meanwhile, when it is determined in step S631 that the main printer 20A is in a low-battery state (step S631: NO), the CPU 21 determines whether or not the list for the sub printer is two or more rows (step S632).

When it is determined in step S632 that the list for the sub printer is two or more rows (step S632: YES), the CPU 21 divides the list for the sub printer into two, thereby creating a list for the main printer and a list for the sub printer (step S633). Then, the CPU 21 transmits, to the sub printer 20B, the list for the sub printer that is created in step S633, through wireless communication via WLAN (step S634). Subsequently, the main printer 20A returns the flow to step S607.

Meanwhile, when it is determined in step S632 that the list for the main printer is not two or more rows (step S632: NO), the CPU 21 determines whether or not the list for the main printer is empty (step S635).

When it is determined in step S635 that the list for the main printer is not empty (step S635: NO), the main printer 20A returns the flow to step S607.

Meanwhile, when it is determined in step S635 that the list for the main printer is empty (step S635: YES), the CPU 21 determines whether or not the list for the sub printer is empty (step S636).

When it is determined in step S636 that the list for the sub printer is not empty (step S636: NO), the main printer 20A returns the flow to step S607.

Meanwhile, when it is determined in step S636 that the list for the sub printer is empty (step S636: YES), the CPU 21 notifies the sub printer 20B of "there are no image data awaiting printing" (step S637). Subsequently, the main printer 20A ends a series of steps as illustrated in FIG. 6A to FIG. 6D.

(Procedure of a Process by the Sub Printer 20B)

FIG. 7 is a flowchart illustrating a procedure of a printing process by the sub printer 20B according to the second embodiment.

First, the communication I/F 25 wirelessly communicably connects to the main printer 20A via WLAN (step S701).

Next, the CPU 21 determines whether or not the list for the sub printer is received from the main printer 20A (step S702).

When it is determined in step S702 that the list for the sub printer is not received from the main printer 20A (step S702: NO), the sub printer 20B performs step S702 again.

When it is determined in step S702 that the list for the sub printer is received from the main printer 20A (step S702:

YES), the CPU 21 sets, in the sub printer 20B, the list for the sub printer that is received from the main printer 20A (step S703).

Next, the CPU 21 prohibits operation of the input device 27 (step S704).

Next, the CPU 21 determines whether or not image data are received from the main printer 20A (step S705).

When it is determined in step S705 that image data are not received from the main printer 20A (step S705: NO), the sub printer 20B performs step S705 again.

Meanwhile, when it is determined in step S705 that image data are received from the main printer 20A (step S705: YES), the CPU 21 decodes the image data that are received from the main printer 20A (step S706).

Next, the printing mechanism 26 starts printing of the image data decoded in step S706 (step S707).

Next, the CPU 21 determines whether or not the sub printer 20B is currently printing (step S708).

When it is determined in step S708 that the sub printer 20B is currently printing (step S708: YES), the sub printer 20B performs step S708 again.

Meanwhile, when it is determined in step S708 that the sub printer 20B is not currently printing (step S708: NO), the CPU 21 determines whether or not the sub printer 20B is in a low-battery state (step S709).

When it is determined in step S709 that the sub printer 20B is in a low-battery state (step S709: YES), the CPU 21 notifies the main printer 20A of the sub printer 20B being in a low-battery state through wireless communication via WLAN (step S710). Subsequently, the sub printer 20B ends a series of steps as illustrated in FIG. 7.

Meanwhile, when it is determined in step S709 that the sub printer 20B is not in a low-battery state (step S709: NO), the CPU 21 notifies the main printer 20A of completion of printing through wireless communication via WLAN (step S711).

Next, the CPU 21 determines whether or not a new list for the sub printer is received from the main printer 20A (step S712).

When it is determined in step S712 that the new list for the sub printer is received (step S712: YES), the CPU 21 sets, in the sub printer 20B, the new list for the sub printer that is received from the main printer 20A (step S713). Subsequently, the sub printer 20B returns the flow to step S705.

Meanwhile, when it is determined in step S712 that the new list for the sub printer is not received (step S712: NO), the CPU 21 determines whether or not printing of all of the image data included in the list for the sub printer is completed (step S714).

When it is determined in step S714 that printing of all of the image data included in the list for the sub printer is not completed (step S714: NO), the sub printer 20B returns the flow to step S705.

Meanwhile, when it is determined in step S714 that printing of all of the image data included in the list for the sub printer is completed (step S714: YES), the CPU 21 determines whether or not "there are no image data awaiting printing" is received from the main printer 20A (step S715).

When it is determined in step S715 that "there are no image data awaiting printing" is not received (step S715: NO), the sub printer 20B returns the flow to step S712.

Meanwhile, when it is determined in step S715 that "there are no image data awaiting printing" is received (step S715: YES), the CPU 21 permits operation of the input device 27 (step S716). Subsequently, the sub printer 20B ends a series of steps as illustrated in FIG. 7.

(Effects)

As described above, according to the printing system 10-2 according to the second embodiment, the main printer 20A creates the list for the main printer of the image data to be printed by the main printer 20A and the list for the sub printer of the image data to be printed by the sub printer 20B. The main printer 20A deletes, from the list for the main printer, the image data that start being printed by the main printer 20A, and deletes, from the list for the sub printer, the image data that start being printed by the sub printer 20B. In response to the list for the main printer being empty, the main printer 20A notifies the sub printer 20B of the list for the main printer being empty. In response to receiving the list for the main printer being empty, the sub printer 20B divides the list for the sub printer into two lists, and transmits one of the lists to the main printer 20A and uses the other list as a new list for the sub printer. In response to the list for the sub printer being empty, the sub printer 20B notifies the main printer 20A of the list for the sub printer being empty. In response to receiving the list for the sub printer being empty, the main printer 20A divides the list for the main printer into two lists, and transmits one of the lists to the sub printer 20B and uses the other list as a new list for the main printer.

Thereby, according to the printing system 10-2 according to the second embodiment, in response to one of the list for the main printer and the list for the sub printer being empty, by dividing the other list into two lists, it is possible to use two printers and perform distributed printing of the image data of the plurality of images included in the other list.

Therefore, according to the printing system 10-2 according to the second embodiment, it is possible to efficiently perform distributed printing of the image data of the plurality of images with the main printer 20A and the sub printer 20B without the use of, for example, a server device that controls distributed printing.

Also, according to the printing system 10-2 according to the second embodiment, the main printer 20A checks that the main printer 20A is able to perform further printing every time the main printer 20A completes printing of image data of a single image, and the sub printer 20B checks that the sub printer 20B is able to perform further printing every time the sub printer 20B completes printing of image data of a single image. When the main printer 20A is able to perform further printing and the sub printer 20B is unable to perform further printing, the sub printer 20B transmits the list for the sub printer to the main printer 20A, and the main printer 20A prints all of the remaining image data awaiting printing. When the sub printer 20B is able to perform further printing and the main printer 20A is unable to perform further printing, the main printer 20A transmits the list for the main printer to the sub printer 20B, and the sub printer 20B prints all of the remaining image data awaiting printing.

Thereby, according to the printing system 10-2 according to the second embodiment, when one printer of the main printer 20A and the sub printer 20B is unable to perform printing, the other printer is able to perform all of the remaining image data awaiting printing; i.e., distributed printing is possible.

Therefore, according to the printing system 10-2 according to the second embodiment, it is possible to efficiently perform distributed printing of the image data of the plurality of images with the main printer 20A and the sub printer 20B without the use of, for example, a server device that controls distributed printing.

Also, according to the printing system 10-2 according to the second embodiment, the main printer 20A determines whether or not the main printer 20A is able to perform printing every time the main printer 20A completes printing of image data of a single image. If the main printer 20A is unable to perform printing, the main printer 20A does not print the next image data. The sub printer 20B determines whether or not the sub printer 20B is able to perform printing every time the sub printer 20B completes printing of image data of a single image. If the sub printer 20B is unable to perform printing, the sub printer 20B does not transmit a signal of completion of the printing to the main printer 20A.

Thereby, according to the printing system 10-2 according to the second embodiment, the sub printer 20B can readily determine that one printer of the main printer 20A and the sub printer 20B is unable to perform printing, and as a result this printer is not permitted to print the next image data.

Also, according to the printing system 10-2 according to the second embodiment, the main printer 20A determines whether or not the main printer 20A is able to perform printing based on the remaining battery level of the main printer 20A, and the sub printer 20B determines whether or not the sub printer 20B is able to perform printing based on the remaining battery level of the sub printer 20B.

Thereby, according to the printing system 10-2 according to the second embodiment, the sub printer 20B can readily determine that one printer of the main printer 20A and the sub printer 20B reaches an insufficient remaining battery level, and as a result this printer is not permitted to print the next image data.

Third Embodiment (Configuration of Printing System 10-3)

Although not illustrated, a configuration of the printing system 10-3 according to the third embodiment is similar to the configuration of the printing system 10 according to the first embodiment (see FIG. 1) or the configuration of the printing system 10-2 according to the second embodiment (see FIG. 5).

(Procedure of a Process by the Main Printer 20A)

Figure 8A:
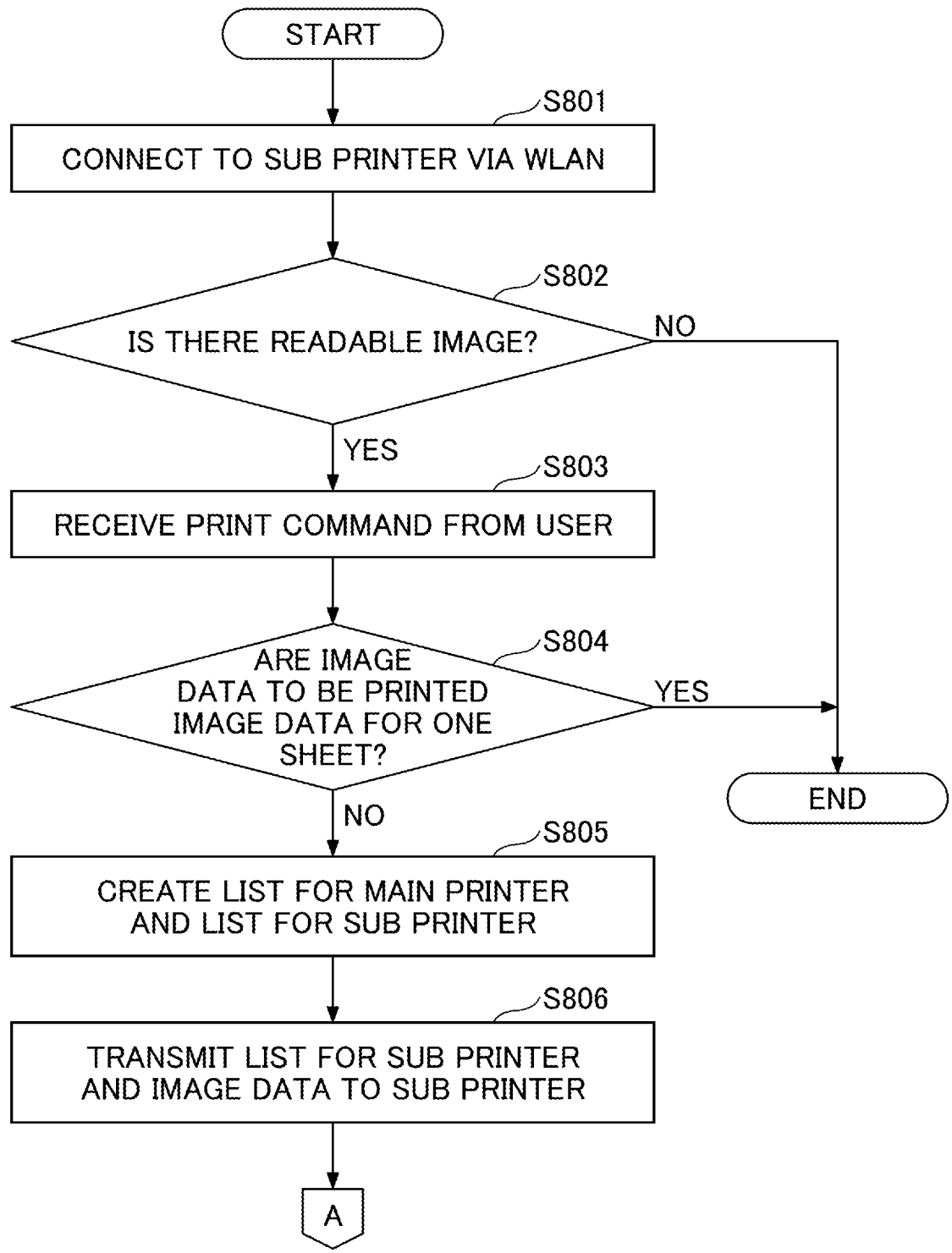
FIG. 8A is a flowchart illustrating a procedure of a printing process by a main printer according to a third embodiment.
Figure 8B:
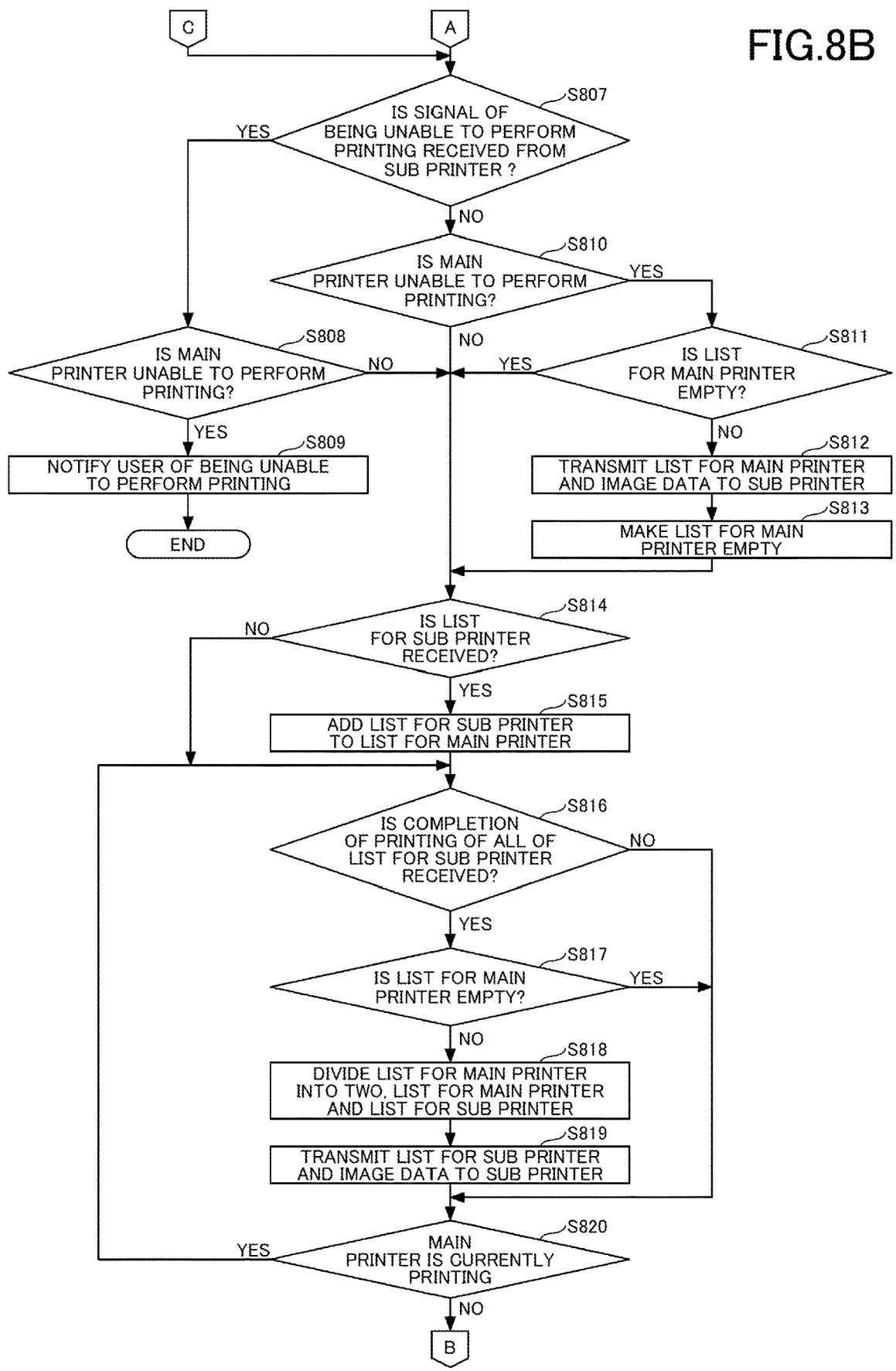
FIG. 8B is a flowchart illustrating a procedure of the printing process by the main printer according to the third embodiment.

FIG. 8A to FIG. 8C are flowcharts illustrating a procedure of a printing process by the main printer 20A according to the third embodiment.

First, the communication I/F 25 wirelessly communicably connects to the sub printer 20B via WLAN (step S801).

Next, the CPU 21 determines whether or not there are any image data that can be read out to the main printer 20A (step S802).

When it is determined in step S802 that there are no image data that can be read out to the main printer 20A (step S802: NO), the main printer 20A ends a series of steps as illustrated in FIG. 8A to FIG. 8C.

Meanwhile, when it is determined in step S802 that there are any image data that can be read out to the main printer 20A (step S802: YES), the CPU 21 receives a printing command from a user (step S803).

Next, the CPU 21 determines whether or not the image data to be printed are image data for one sheet (step S804).

When it is determined in step S804 that the image data to be printed are image data for one sheet (step S804: YES), the main printer 20A may print the image data by itself (i.e., distributed printing is not necessary) and ends a series of steps as illustrated in FIG. 8A to FIG. 8C.

Meanwhile, when it is determined in step S804 that the image data to be printed are not image data for one sheet (step S804: NO), the CPU 21 creates a list for the main printer and a list for the sub printer (step S805). For example, the CPU 21 includes, in the list for the main printer, half the image data of the plurality of images to be printed, and includes, in the list for the sub printer, the other half of the image data of the plurality of images to be printed.

Next, the CPU 21 transmits, to the sub printer 20B, the list for the sub printer that is created in step S805, through wireless communication via WLAN (step S806).

Next, the CPU 21 determines whether or not a signal of being unable to perform printing is received from the sub printer 20B (step S807).

When it is determined in step S807 that the signal of being unable to perform printing is received (step S807: YES), the CPU 21 determines whether or not the main printer 20A is unable to perform printing (step S808). Here, the "main printer 20A is unable to perform printing" is, for example, a case in which the main printer 20A is in a low-battery state, or a case of running out of sheets. In particular, the "main printer 20A is unable to perform printing" is preferably a case in which the main printer 20A is in a low-battery state. This is because the low-battery state of the main printer 20A cannot be overcome for a short period of time, and thus the effects of the present disclosure are highly effectively exhibited.

When it is determined in step S808 that the main printer 20A is not unable to perform printing (step S808: NO), the sub printer 20B causes the flow to proceed to step S814.

Meanwhile, when it is determined in step S808 that the main printer 20A is unable to perform printing (step S808: YES), the CPU 21 notifies a user of being unable to perform printing (step S809). Subsequently, the main printer 20A ends a series of steps as illustrated in FIG. 8A to FIG. 8C.

When it is determined in step S807 that a signal of being unable to perform printing is not received (step S807: NO), the CPU 21 determines whether or not the main printer 20A is unable to perform printing (step S810).

When it is determined in step S810 that the main printer 20A is not unable to perform printing (step S810: NO), the sub printer 20B causes the flow to proceed to step S814.

Meanwhile, when it is determined in step S810 that the main printer 20A is unable to perform printing (step S810: YES), the CPU 21 determines whether or not the list for the main printer is empty (step S811).

When it is determined in step S811 that the list for the main printer is empty (step S811: YES), the main printer 20A causes the flow to proceed to step S814.

Meanwhile, when it is determined in step S811 that the list for the main printer is not empty (step S811: NO), the CPU 21 transmits, to the sub printer 20B, the list for the main printer and image data, through wireless communication via WLAN (step S812). Then, the CPU 21 makes the list for the main printer empty (step S813). Subsequently, the main printer 20A causes the flow to proceed to step S814.

In step S814, the CPU 21 determines whether or not the list for the sub printer is received from the sub printer 20B (step S814).

When it is determined in step S814 that the list for the sub printer is not received (step S814: NO), the main printer 20A causes the flow to proceed to step S816.

Meanwhile, when it is determined in step S814 that the list for the sub printer is received (step S814: YES), the CPU 21 adds the received list for the sub printer to the list for the main printer (step S815). Subsequently, the main printer 20A causes the flow to proceed to step S816.

In step S816, the CPU 21 determines whether or not a notification of completion of printing of all of the list for the sub printer is received from the sub printer 20B (step S816).

When it is determined in step S816 that a notification of completion of printing of all of the list for the sub printer is not received (step S816: NO), the main printer 20A causes the flow to proceed to step S820.

Meanwhile, when it is determined in step S816 that a notification of completion of printing of all of the list for the sub printer is received (step S816: YES), the CPU 21 determines whether or not the list for the main printer is empty (step S817).

When it is determined in step S817 that the list for the main printer is empty (step S817: YES), the main printer 20A causes the flow to proceed to step S820.

Meanwhile, when it is determined in step S817 that the list for the main printer is not empty (step S817: NO), the CPU 21 divides the list for the main printer into two, thereby creating a list for the main printer and a list for the sub printer (step S818).

Then, the CPU 21 transmits, to the sub printer 20B, the list for the sub printer that is created in step S821 and image data, through wireless communication via WLAN (step S819). Subsequently, the main printer 20A causes the flow to proceed to step S820.

In step S820, the CPU 21 determines whether or not the main printer 20A is currently printing (step S820).

When it is determined in step S820 that the main printer 20A is currently printing (step S820: YES), the main printer 20A returns the flow to step S816.

Meanwhile, when it is determined in step S820 that the main printer 20A is not currently printing (step S820: NO), the CPU 21 determines whether or not the list for the main printer is empty (step S821).

When it is determined in step S821 that the list for the main printer is empty (step S821: YES), the CPU 21 notifies the sub printer 20B of the list for the main printer being empty (step S822). Subsequently, the main printer 20A causes the flow to proceed to step S826.

Meanwhile, when it is determined in step S821 that the list for the main printer is not empty (step S821: NO), the CPU 21 decodes the top image data of the list for the main printer (step S823).

Then, the CPU 21 deletes the top row of the list for the main printer (step S824). Moreover, the printing mechanism 26 starts printing of the image data decoded in step S823 (step S825). Subsequently, the main printer 20A causes the flow to proceed to step S826.

In step S826, the CPU 21 determines whether or not a notification of completion of printing of all of the list for the sub printer is received from the sub printer 20B (step S825).

When it is determined in step S826 that a notification of completion of printing of all of the list for the sub printer is not received (step S825: NO), the main printer 20A returns the flow to step S807.

Meanwhile, when it is determined in step S826 that a notification of completion of printing of all of the list for the sub printer is received (step S825: YES), the CPU 21 notifies the sub printer 20B of completion of printing of all of the images (step S827). Subsequently, the main printer 20A ends a series of steps as illustrated in FIG. 8A to FIG. 8C.

(Procedure of a Process by the Sub Printer 20B)

Figure 9A:
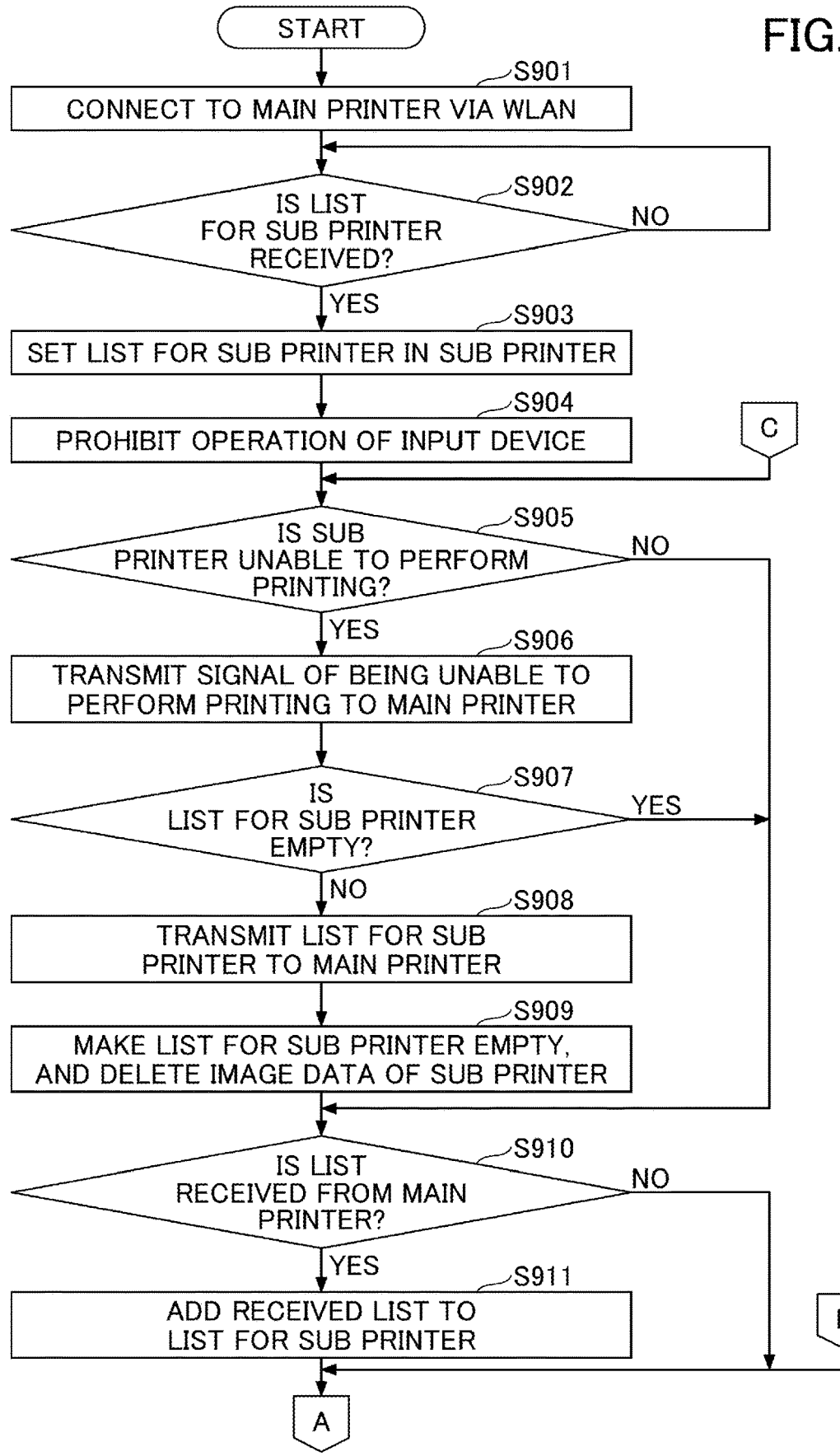
FIG. 9A is a flowchart illustrating a procedure of a printing process by a sub printer according to the third embodiment.

FIG. 9A and FIG. 9B are flowcharts illustrating a procedure of a printing process by the sub printer 20B according to the third embodiment.

First, the communication I/F 25 wirelessly communicably connects to the main printer 20A via WLAN (step S901).

Next, the CPU 21 determines whether or not a list for the sub printer is received from the main printer 20A (step S902).

When it is determined in step S902 that the list for the sub printer is received from the main printer 20A (step S902: NO), the sub printer 20B performs step S902 again.

When it is determined in step S902 that the list for the sub printer is received from the main printer 20A (step S902: YES), the CPU 21 sets, in the sub printer 20B, the list for the sub printer received from the main printer 20A (step S903).

Next, the CPU 21 prohibits operation of the input device 27 (step S904).

Next, the CPU 21 determines whether or not the sub printer 20B is unable to perform printing (step S905). Here, the "sub printer 20B is unable to perform printing" is, for example, a case in which the sub printer 20B is in a low-battery state, or a case of running out of sheets. In particular, the "sub printer 20B is unable to perform printing" is preferably a case in which the sub printer 20B is in a low-battery state. This is because the low-battery state of the sub printer 20B cannot be overcome for a short period of time, and thus the effects of the present disclosure are highly effectively exhibited.

When it is determined in step S905 that the sub printer 20B is not unable to perform printing (step S905: NO), the sub printer 20B causes the flow to proceed to step S910.

Meanwhile, when it is determined in step S905 that the sub printer 20B is unable to perform printing (step S905: YES), the CPU 21 transmits, to the main printer 20A, a signal of being unable to perform printing, indicating that the sub printer 20B is unable to perform printing, through wireless communication via WLAN (step S906).

Next, the CPU 21 determines whether or not the list for the sub printer is empty (step S907).

When it is determined in step S907 that the list for the sub printer is empty (step S907: YES), the sub printer 20B causes the flow to proceed to step S910.

Meanwhile, when it is determined in step S907 that the list for the sub printer is not empty (step S907: NO), the CPU 21 transmits the list for the sub printer to the main printer 20A through wireless communication via WLAN (step S908). Then, the CPU 21 makes the list for the sub printer empty and deletes the image data of the sub printer 20B (step S909). Subsequently, the sub printer 20B causes the flow to proceed to step S910.

In step S910, the CPU 21 determines whether or not the list is received from the main printer 20A (step S910).

When it is determined in step S910 that the list is not received from the main printer 20A (step S910: NO), the sub printer 20B causes the flow to proceed to step S912.

Meanwhile, when it is determined in step S910 that the list is received from the main printer 20A (step S910: YES), the CPU 21 adds the list received from the main printer 20A to the list for the sub printer (step S911). Subsequently, the sub printer 20B causes the flow to proceed to step S912.

In step S912, the CPU 21 determines whether or not a notification of completion of printing of all of the list for the main printer is received from the main printer 20A (step S912).

When it is determined in step S912 that a notification of completion of printing of all of the list for the main printer is not received (step S912: NO), the sub printer 20B causes the flow to proceed to step S916.

Meanwhile, when it is determined in step S912 that a notification of completion of printing of all of the list for the main printer is received (step S912: YES), the CPU 21 determines whether or not there are remaining image data in the list for the sub printer (step S913).

When it is determined in step S913 that there are not remaining image data in the list for the sub printer (step S913: NO), the sub printer 20B causes the flow to proceed to step S916.

Meanwhile, when it is determined in step S913 that there are remaining image data in the list for the sub printer (step S913: YES), the CPU 21 divides the list for the sub printer into two, thereby creating a list for the main printer and a list for the sub printer (step S914).

Then, the CPU 21 transmits, to the main printer 20A, the list for the main printer that is created in step S914, through wireless communication via WLAN (step S915). Subsequently, the sub printer 20B causes the flow to proceed to step S916.

In step S916, the CPU 21 determines whether or not the sub printer 20B is currently printing (step S916).

When it is determined in step S916 that the sub printer 20B is currently printing (step S916: YES), the sub printer 20B returns the flow to step S912.

Meanwhile, when it is determined in step S916 that the sub printer 20B is not currently printing (step S916: NO), the CPU 21 decodes the top image data of the list for the sub printer (step S917).

Next, the CPU 21 deletes the top row of the list for the sub printer (step S918).

Next, the printing mechanism 26 starts printing of the image data decoded in step S917 (step S919).

Next, the CPU 21 determines whether or not there are remaining image data in the list for the sub printer (step S920).

When it is determined in step S920 that there are remaining image data in the list for the sub printer (step S920: YES), the sub printer 20B returns the flow to step S905.

Meanwhile, when it is determined in step S920 that there are not remaining image data in the list for the sub printer (step S920: NO), the CPU 21 notifies the main printer 20A of the list for the sub printer being empty, through wireless communication via WLAN (step S921).

Next, the CPU 21 determines whether or not a notification of completion of printing of all of the images is received from the main printer 20A (step S922).

When it is determined in step S922 that a notification of completion of printing of all of the images is received (step S922: NO), the sub printer 20B returns the flow to step S905.

Meanwhile, when it is determined in step S922 that a notification of completion of printing of all of the images is received (step S922: YES), the CPU 21 permits operation of the input device 27 (step S923). Then, the CPU 21 deletes the image data from the memory of the sub printer 20B (step S924). Subsequently, the sub printer 20B ends a series of steps as illustrated in FIG. 9A and FIG. 9B.

Note that, in the third embodiment, the sub printer 20B decodes the image data of a single image every time the sub printer 20B prints the image data of a single image. Therefore, the main printer 20A collectively transmits the image data of the plurality of images to the sub printer 20B. Also, when the main printer 20A uses, for example, an SD memory card as the storage medium 22, the image file is not deleted from the storage medium 22 even after completion of printing of all of the images. However, when the main printer 20A uses a smartphone as the storage medium 22, the image data stored in the smartphone are copied in a built-in memory (RAM 23) of the main printer 20A. Therefore, after completion of printing of all of the images, the image data are deleted from the built-in memory (RAM 23) of the main printer 20A (step S924).

(Effects)

As described above, according to the printing system 10-3 according to the third embodiment, the main printer 20A creates the list for the main printer of the image data to be printed by the main printer 20A and the list for the sub printer of the image data to be printed by the sub printer 20B. The main printer 20A deletes, from the list for the main printer, the image data that start being printed by the main printer 20A, and deletes, from the list for the sub printer, the image data that start being printed by the sub printer 20B. In response to the list for the main printer being empty, the main printer 20A notifies the sub printer 20B of the list for the main printer being empty. In response to receiving the list for the main printer being empty, the sub printer 20B divides the list for the sub printer into two lists, and transmits one of the lists to the main printer 20A and uses the other list as a new list for the sub printer. In response to the list for the sub printer being empty, the sub printer 20B notifies the main printer 20A of the list for the sub printer being empty. In response to receiving the list for the sub printer being empty, the main printer 20A divides the list for the main printer into two lists, and transmits one of the lists to the sub printer 20B and uses the other list as a new list for the main printer.

Thereby, according to the printing system 10-3 according to the third embodiment, in response to one of the list for the main printer and the list for the sub printer being empty, by dividing the other list into two lists, it is possible to use two printers and perform distributed printing of the image data of the plurality of images included in the other list.

Therefore, according to the printing system 10-3 according to the third embodiment, it is possible to efficiently perform distributed printing of the image data of the plurality of images with the main printer 20A and the sub printer 20B without the use of, for example, a server device that controls distributed printing.

According to the printing system according to one embodiment, it is possible to appropriately distribute the load of printing of image data of a plurality of images to a plurality of printers without the use of, for example, a server device that controls distributed printing.

Although embodiments of the present invention have been described above in detail, the present invention is not limited to the above-described embodiments. Various modifications or alterations are possible within the scope of the claims as recited.

What is claimed is:

1. A printing system, comprising:
    a main printer configured to print an image sheet by sheet and directly transmit a print instruction and image data to a sub printer;
    the sub printer communicably connected to the main printer and configured to print an image sheet by sheet based on the print instruction and the image data that are directly transmitted from the main printer; and
    a storage medium that is configured to store image data of a plurality of images and from which the main printer is able to read out the image data, wherein
    in response to changing of a state of the sub printer, the sub printer notifies the main printer of a changed state,
    the main printer regularly checks print situations of the main printer and the sub printer, and
    in accordance with the print situations that are regularly checked, the main printer determines which of the printers is to be used for printing of an image for each of the image data of the plurality of images, wherein:
the main printer creates a list for the main printer of the image data to be printed by the main printer and a list for the sub printer of the image data to be printed by the sub printer;
the main printer deletes, from the list for the main printer, the image data that start being printed by the main printer, and deletes, from the list for the sub printer, the image data that start being printed by the sub printer;
in response to the list for the main printer being empty, the main printer notifies the sub printer of the list for the main printer being empty;
in response to receiving the list for the main printer being empty, the sub printer divides the list for the sub printer into two lists, and transmits one of the lists to the main printer and uses another list as a new list for the sub printer;
in response to the list for the sub printer being empty, the sub printer notifies the main printer of the list for the sub printer being empty; and
in response to receiving the list for the sub printer being empty, the main printer divides the list for the main printer into two lists, and transmits one of the lists to the sub printer and uses another list as a new list for the main printer.

2. The printing system according to claim 1, wherein:
the main printer creates a list that defines priority of the image data of the plurality of images;
every time the main printer completes printing of the image data of a single image, the main printer prints next image data of a single image that is highest in priority in the list, and deletes the next image data of the single image from the list;
every time the sub printer completes printing of the image data of a single image, the sub printer transmits a signal of completion of the printing to the main printer; and
every time the main printer receives the signal of the completion of the printing, the main printer causes the sub printer to print next image data of a single image that is highest in priority in the list, and deletes the next image data of the single image from the list.

3. The printing system according to claim 2, wherein:
the main printer decodes the image data of the image that is determined to be printed using the main printer; and
the sub printer decodes the image data of the image that is determined to be printed using the sub printer.

4. The printing system according to claim 3, wherein:
each of the main printer and the sub printer includes an input device; and
operation by the input device of the sub printer is prohibited from start of the printing of the image data of the plurality of images until completion of the printing of all of the image data of the plurality of images.

5. The printing system according to claim 1, wherein:
the main printer reflects print settings of the main printer to the sub printer; and
the sub printer prints the image based on the reflected print settings.

6. The printing system according to claim 2, wherein:
the main printer determines whether or not the main printer is able to perform printing every time the main printer completes the printing of the image data of the single image, and in a case where the main printer is unable to perform printing, the main printer does not print the next image data; and
the sub printer determines whether or not the sub printer is able to perform printing every time the sub printer completes the printing of the image data of the single image, and in a case where the sub printer is unable to perform printing, the sub printer does not transmit a signal of completion of the printing to the main printer.

7. The printing system according to claim 6, wherein:
the main printer determines whether or not the main printer is able to perform printing based on a remaining battery level of the main printer; and
the sub printer determines whether or not the sub printer is able to perform printing based on a remaining battery level of the sub printer.

8. The printing system according to claim 1 wherein:
the main printer checks that the main printer is able to perform further printing every time the main printer completes the printing of the image data of the single image;
the sub printer checks that the sub printer is able to perform further printing every time the sub printer completes the printing of the image data of the single image; and
in a case where the main printer is able to perform further printing and the sub printer is unable to perform further printing, the sub printer transmits the list for the sub printer to the main printer, and the main printer prints all of remaining image data awaiting printing; or
in a case where the sub printer is able to perform further printing and the main printer is unable to perform further printing, the main printer transmits the list for the main printer to the sub printer, and the sub printer prints all of remaining image data awaiting printing.

9. The printing system according to claim 1 wherein:
the main printer and the sub printer are wirelessly communicably connected to each other via Wireless LAN or BLUETOOTH.

10. A printing system, comprising:
a main printer configured to print an image sheet by sheet and directly transmit a print instruction and image data to a sub printer; and
a storage medium that is configured to store image data of a plurality of images and from which the main printer is able to read out the image data, wherein
the main printer is communicably connected to the sub printer able to print an image sheet by sheet based on the print instruction and the image data that are directly transmitted from the main printer,
the main printer regularly checks print situations of the main printer and the sub printer,
in accordance with the print situations that are regularly checked, the main printer determines the main printer or the sub printer as a printer to be used for printing of the image for each of the image data of the plurality of images, and
the main printer transmits, to the sub printer, the image data determined to be printed by the sub printer, together with a printing command,
wherein:
the main printer creates a list for the main printer of the image data to be printed by the main printer and a list for the sub printer of the image data to be printed by the sub printer;
the main printer deletes, from the list for the main printer, the image data that start being printed by the main printer, and deletes, from the list for the sub printer, the image data that start being printed by the sub printer;
in response to the list for the main printer being empty, the main printer notifies the sub printer of the list for the main printer being empty;

in response to receiving the list for the main printer being empty, the sub printer divides the list for the sub printer into two lists, and transmits one of the lists to the main printer and uses another list as a new list for the sub printer;

in response to the list for the sub printer being empty, the sub printer notifies the main printer of the list for the sub printer being empty; and in response to receiving the list for the sub printer being empty, the main printer divides the list for the main printer into two lists, and transmits one of the lists to the sub printer and uses another list as a new list for the main printer.

11. A sub printer, comprising:

an input device, wherein the sub printer is connectable to a computer and a main printer configured to directly transmit a print instruction and image data to the sub printer, and in response to receiving a print command from the main printer, the sub printer prohibits operations from the input device and the computer, or in response to receiving, from the main printer, a signal indicating completion of printing of all of image data, the sub printer permits operations from the input device and the computer, wherein the sub printer is configured to print an image sheet by sheet based on the print instruction and the image data that are directly transmitted from the main printer, wherein:

the main printer creates a list for the main printer of the image data to be printed by the main printer and a list for the sub printer of the image data to be printed by the sub printer;

the main printer deletes, from the list for the main printer, the image data that start being printed by the main printer, and deletes, from the list for the sub printer, the image data that start being printed by the sub printer;

in response to the list for the main printer being empty, the main printer notifies the sub printer of the list for the main printer being empty;

in response to receiving the list for the main printer being empty, the sub printer divides the list for the sub printer into two lists, and transmits one of the lists to the main printer and uses another list as a new list for the sub printer;

in response to the list for the sub printer being empty, the sub printer notifies the main printer of the list for the sub printer being empty; and in response to receiving the list for the sub printer being empty, the main printer divides the list for the main printer into two lists, and transmits one of the lists to the sub printer and uses another list as a new list for the main printer.

* * * * *